(12) United States Patent  (10) Patent No.: US 8,855,021 B2
Yamane  (45) Date of Patent: Oct. 7, 2014

(54) VIDEO DELIVERY APPARATUS AND METHOD

(75) Inventor: Toshimizu Yamane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1100 days.

(21) Appl. No.: 12/425,996

(22) Filed: Apr. 17, 2009

(65) Prior Publication Data

US 2009/0276822 A1 Nov. 5, 2009

(30) Foreign Application Priority Data

May 2, 2008 (JP) .................. 2008-120761

(51) Int. Cl.
*H04L 12/28* (2006.01)
*G06F 15/16* (2006.01)
*H04N 7/173* (2011.01)
*H04N 21/218* (2011.01)
*H04N 21/24* (2011.01)
*H04N 21/4728* (2011.01)
*H04N 21/4788* (2011.01)
*H04L 12/751* (2013.01)
*H04L 12/18* (2006.01)
*H04L 29/06* (2006.01)
*H04L 12/44* (2006.01)
*H04L 12/753* (2013.01)
*H04L 29/08* (2006.01)

(52) U.S. Cl.
CPC ............ *H04N 7/17318* (2013.01); *H04L 45/02* (2013.01); *H04L 12/18* (2013.01); *H04L 65/4076* (2013.01); *H04L 12/44* (2013.01); *H04L 45/48* (2013.01); *H04L 67/1042* (2013.01); *H04N 21/21805* (2013.01); *H04N 21/2407* (2013.01); *H04N 21/4728* (2013.01); *H04N 21/4788* (2013.01)

USPC .......................... 370/256; 370/408; 709/252

(58) Field of Classification Search
None
See application file for complete search history.

(56) References Cited

U.S. PATENT DOCUMENTS

| 5,940,391 | A * | 8/1999 | Malkin et al. ................. 370/390 |
| 6,691,312 | B1 * | 2/2004 | Sen et al. ........................ 725/96 |
| 7,529,198 | B2 * | 5/2009 | Jain et al. ...................... 370/256 |
| 7,760,668 | B1 * | 7/2010 | Zinjuvadia .................... 370/256 |
| 7,899,928 | B1 * | 3/2011 | Naik et al. .................... 709/238 |
| 8,089,905 | B2 * | 1/2012 | Umeshima .................... 370/256 |
| 8,144,617 | B2 * | 3/2012 | Watanabe ...................... 370/253 |
| 8,504,734 | B2 * | 8/2013 | Xiong et al. .................. 709/252 |
| 2003/0061368 | A1 * | 3/2003 | Chaddha ........................ 709/231 |
| 2004/0218536 | A1 * | 11/2004 | Yasukawa et al. ............ 370/238 |
| 2005/0201278 | A1 * | 9/2005 | Banerjee et al. .............. 370/229 |
| 2006/0029092 | A1 * | 2/2006 | Luo et al. ...................... 370/432 |
| 2007/0036175 | A1 * | 2/2007 | Zimmermann et al. ....... 370/467 |
| 2007/0086366 | A1 * | 4/2007 | Luo et al. ...................... 370/260 |
| 2008/0002693 | A1 * | 1/2008 | Moki et al. .................... 370/390 |
| 2008/0205291 | A1 * | 8/2008 | Li et al. ......................... 370/254 |
| 2009/0167841 | A1 * | 7/2009 | Wu et al. .................... 348/14.08 |
| 2009/0252033 | A1 * | 10/2009 | Ramakrishnan et al. ..... 370/228 |
| 2009/0276822 | A1 * | 11/2009 | Yamane ......................... 725/118 |
| 2009/0327918 | A1 * | 12/2009 | Aaron et al. .................. 709/204 |
| 2010/0195610 | A1 * | 8/2010 | Zhong et al. .................. 370/329 |
| 2011/0299427 | A1 * | 12/2011 | Chu et al. ...................... 370/256 |
| 2012/0047405 | A1 * | 2/2012 | Smaak et al. ................... 714/48 |

\* cited by examiner

*Primary Examiner* — Timothy J Weidner

(74) *Attorney, Agent, or Firm* — Fitzpatrick, Cella, Harper & Scinto

(57) ABSTRACT

To reduce the delivery delay of video data to a display device in which a control right for adjusting parameters of the video data is vested, a video delivery apparatus modifies a delivery tree for delivering the video data to multiple display devices, and delivers the video data to the multiple display device via a network in accordance with the delivery tree.

29 Claims, 33 Drawing Sheets

PHYSICAL DATA FLOW

LOGICAL DATA FLOW

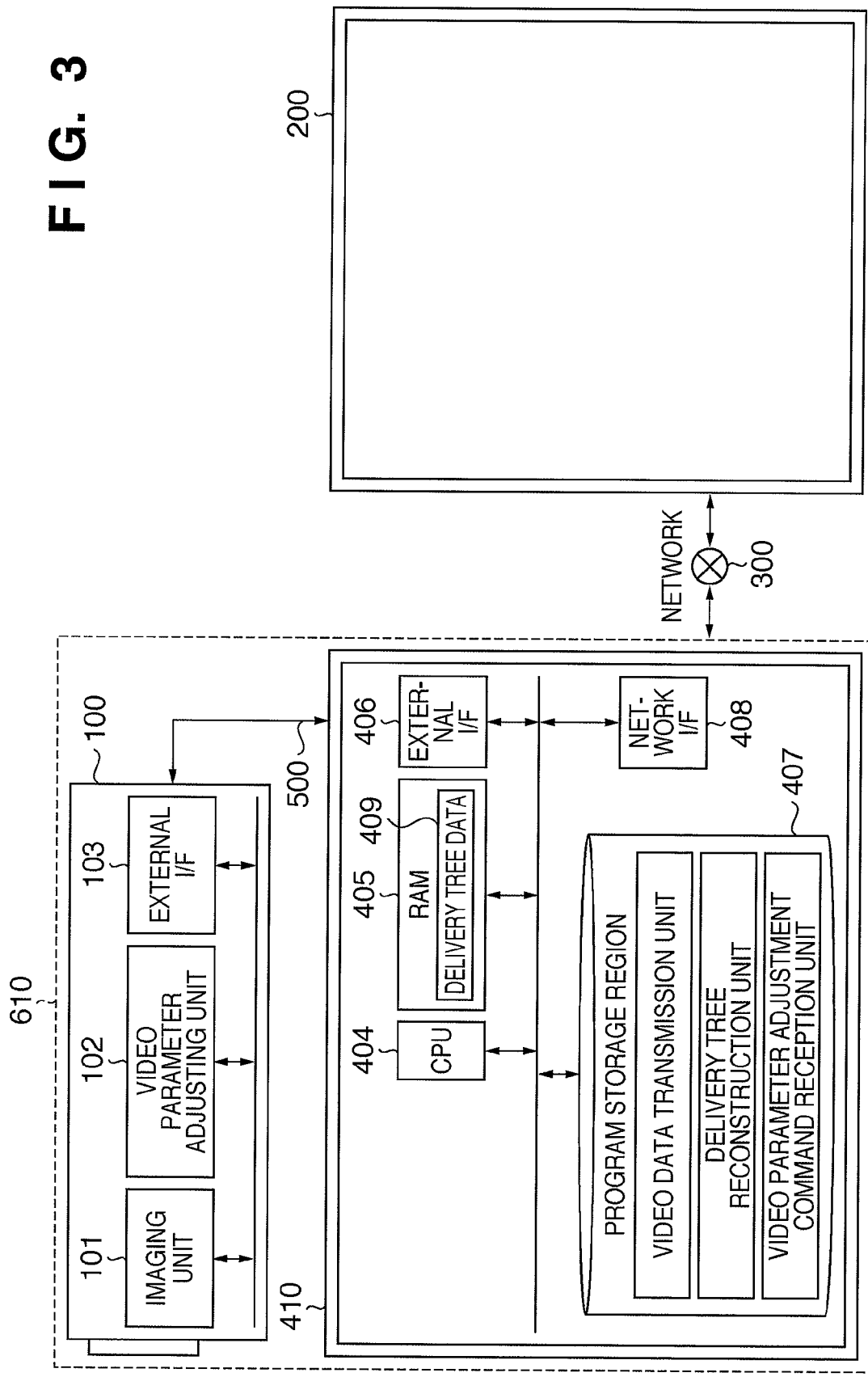

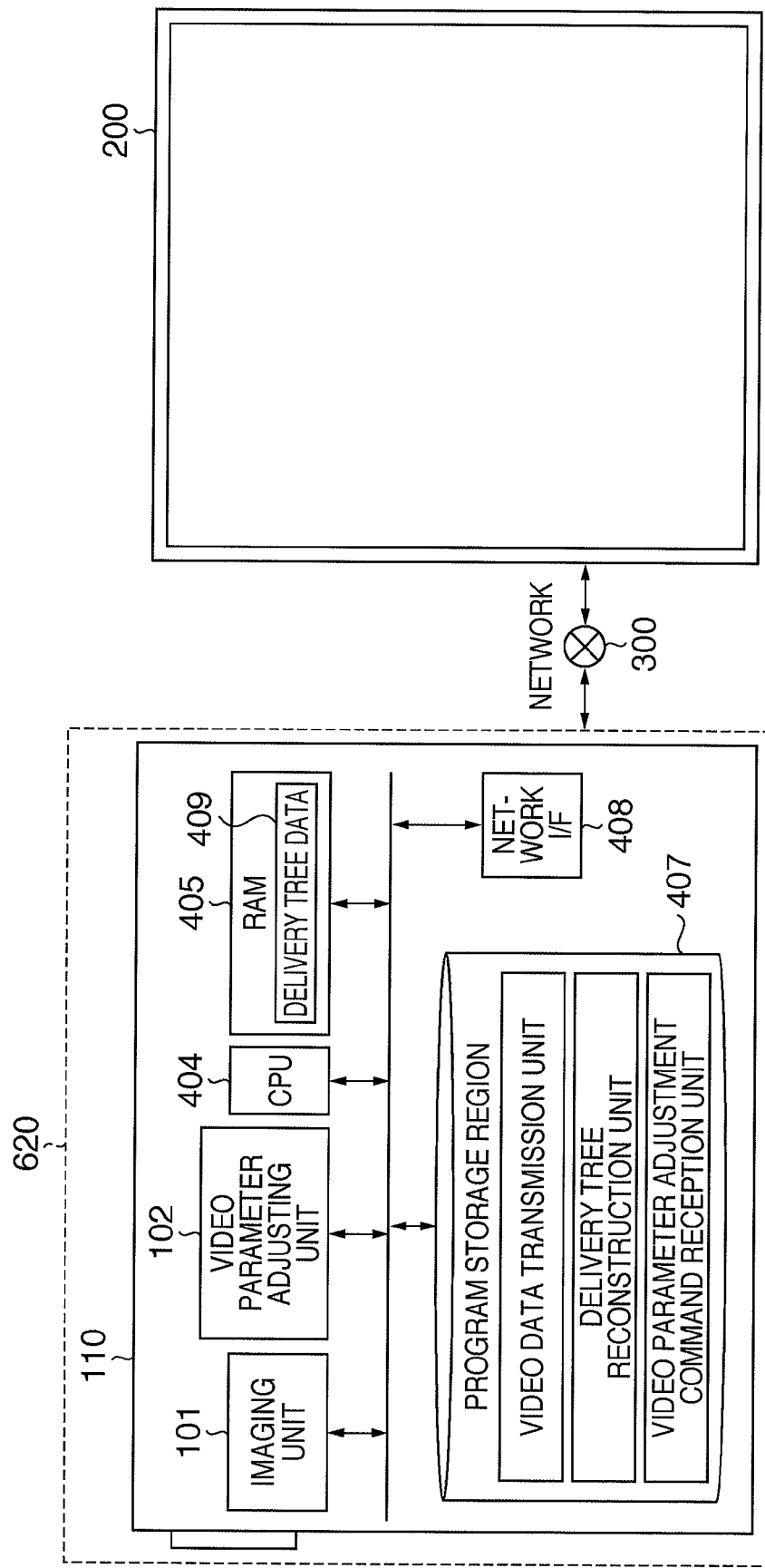

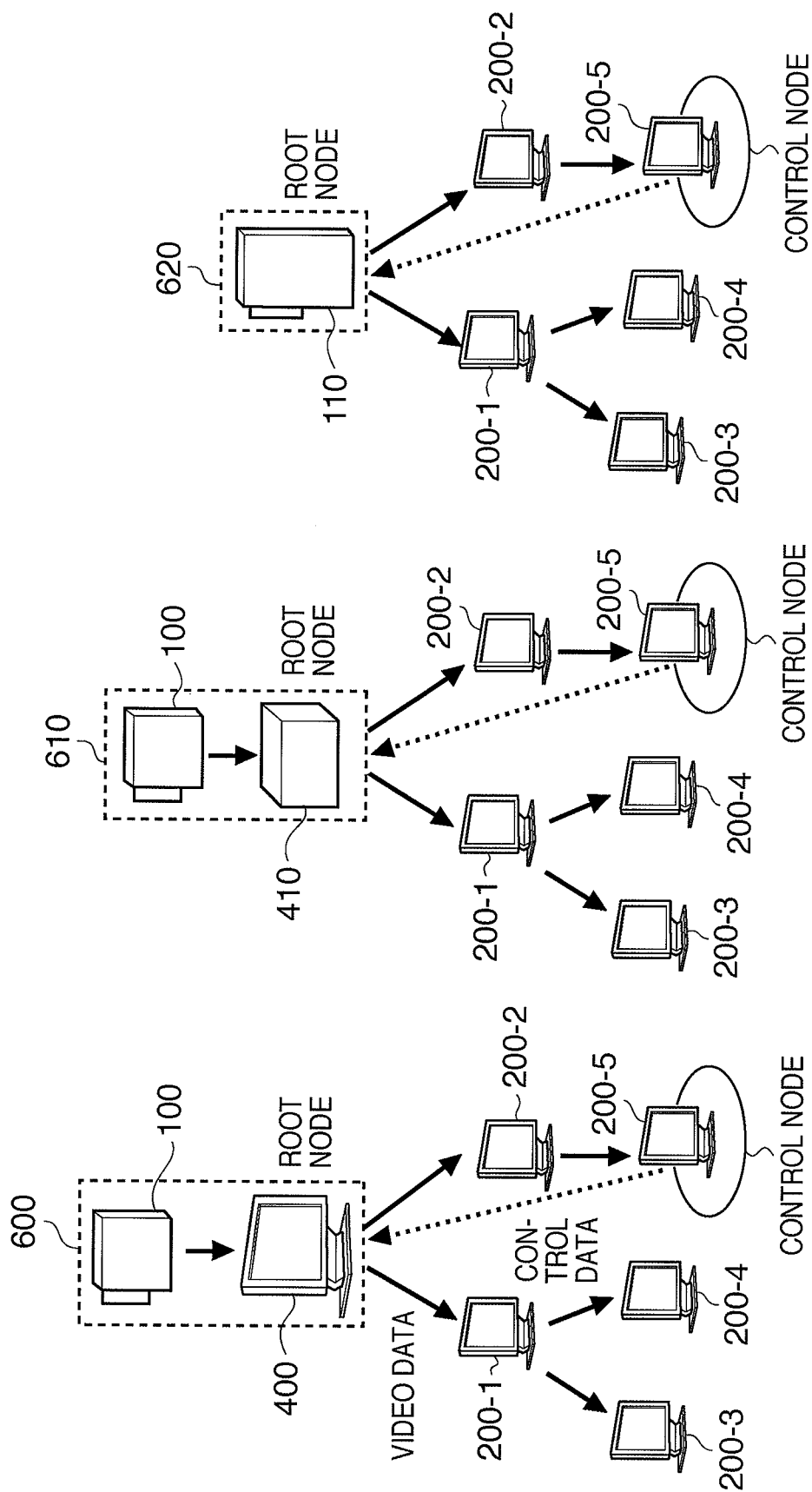

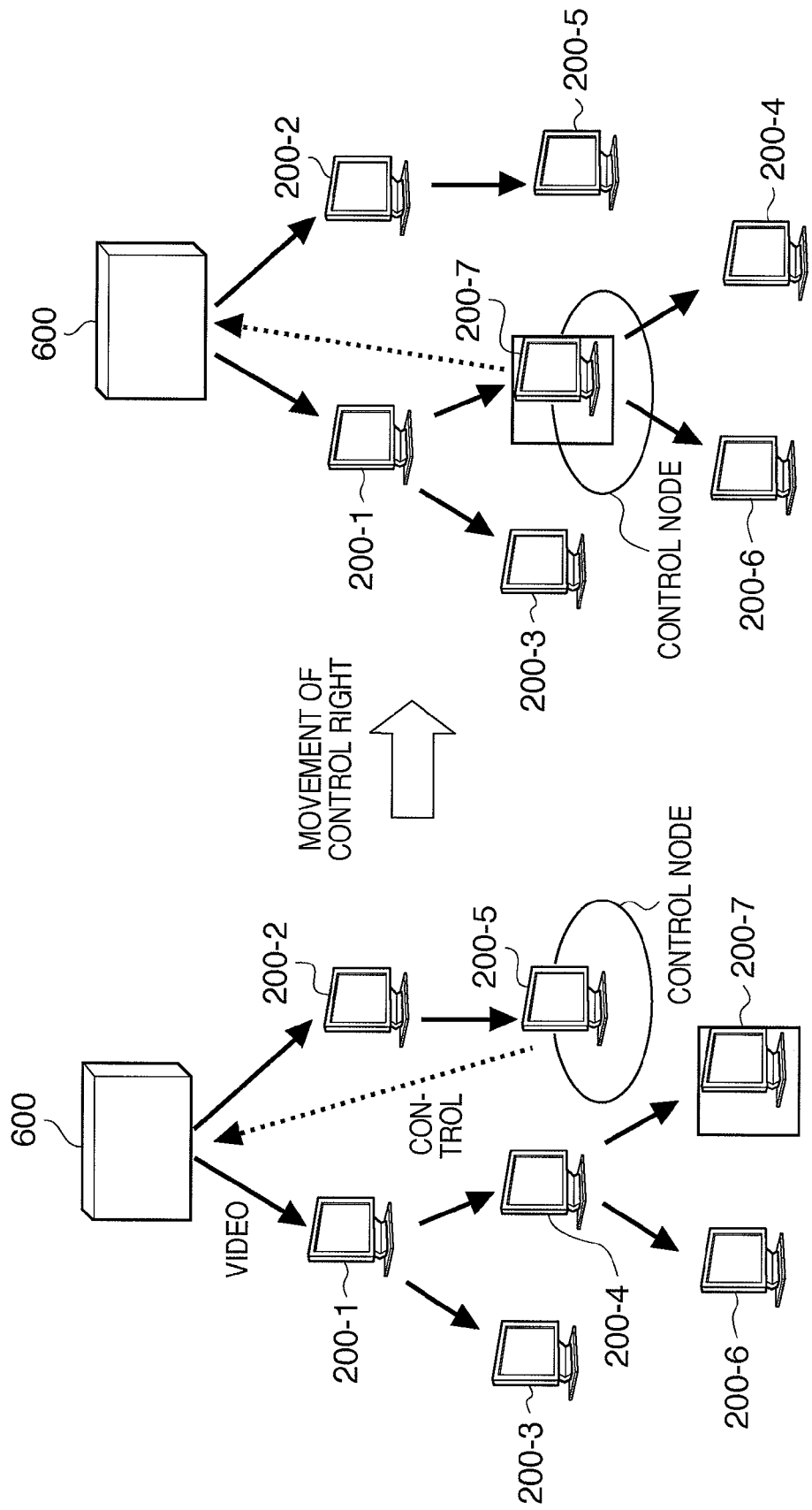

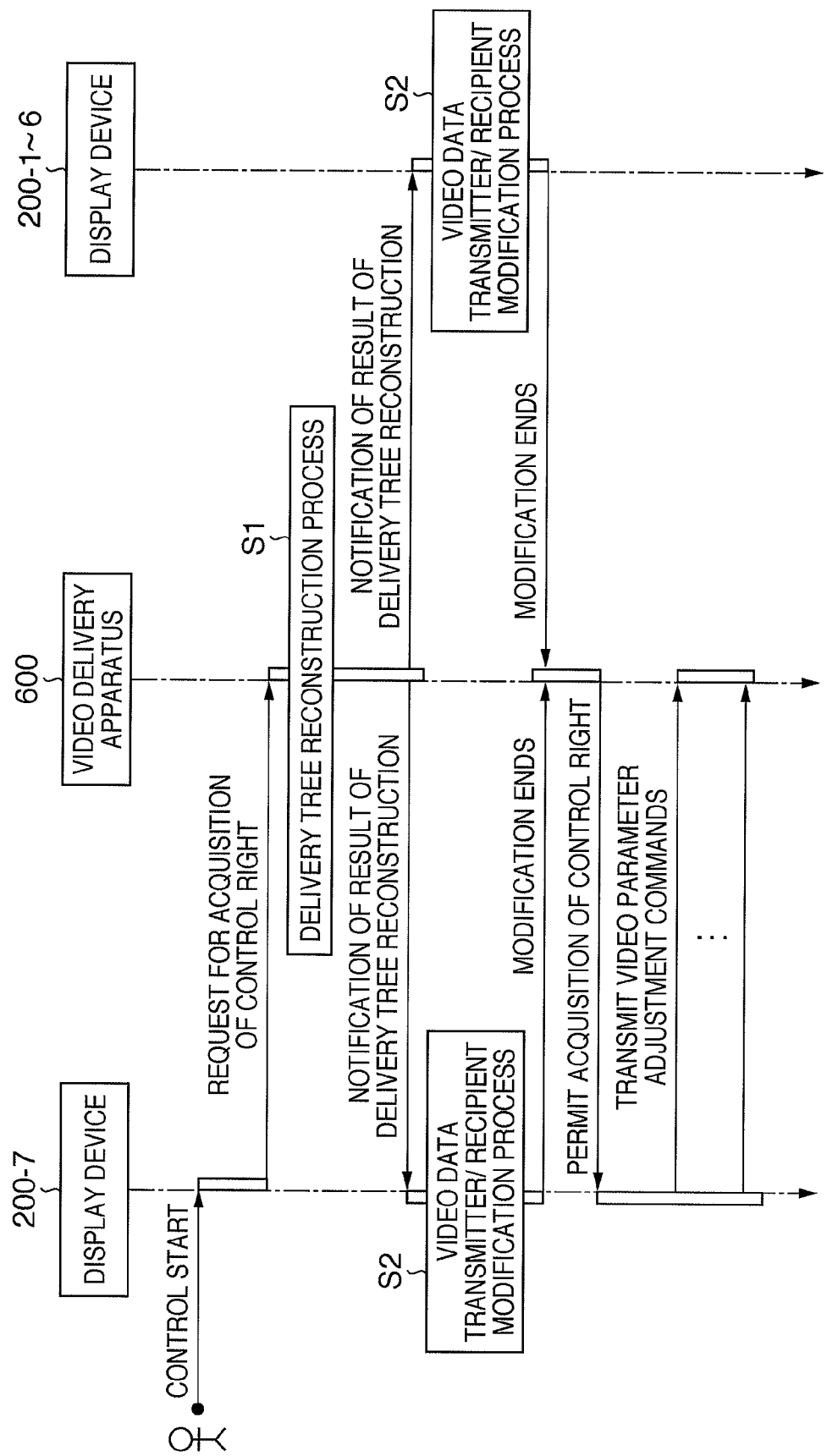

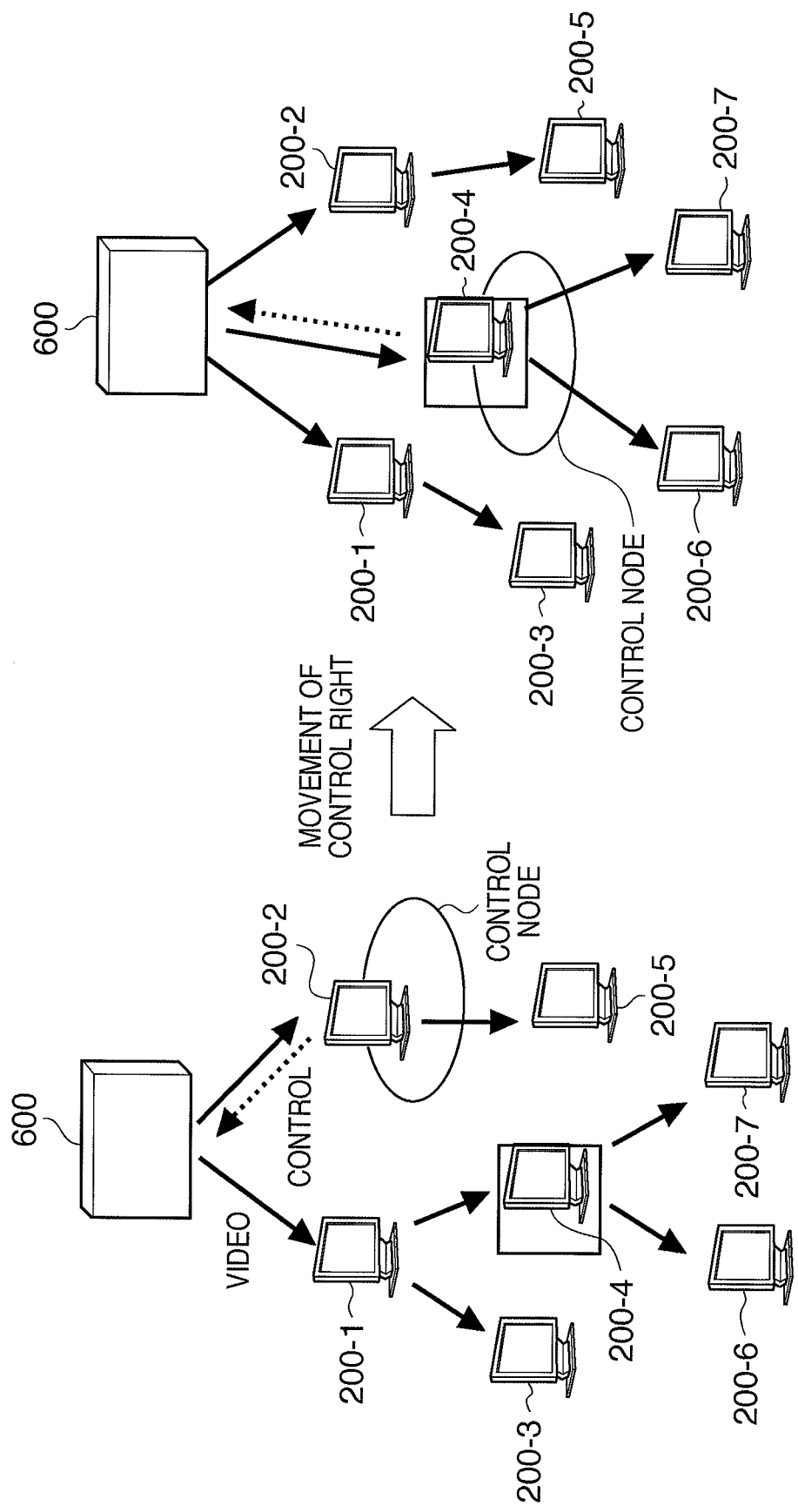

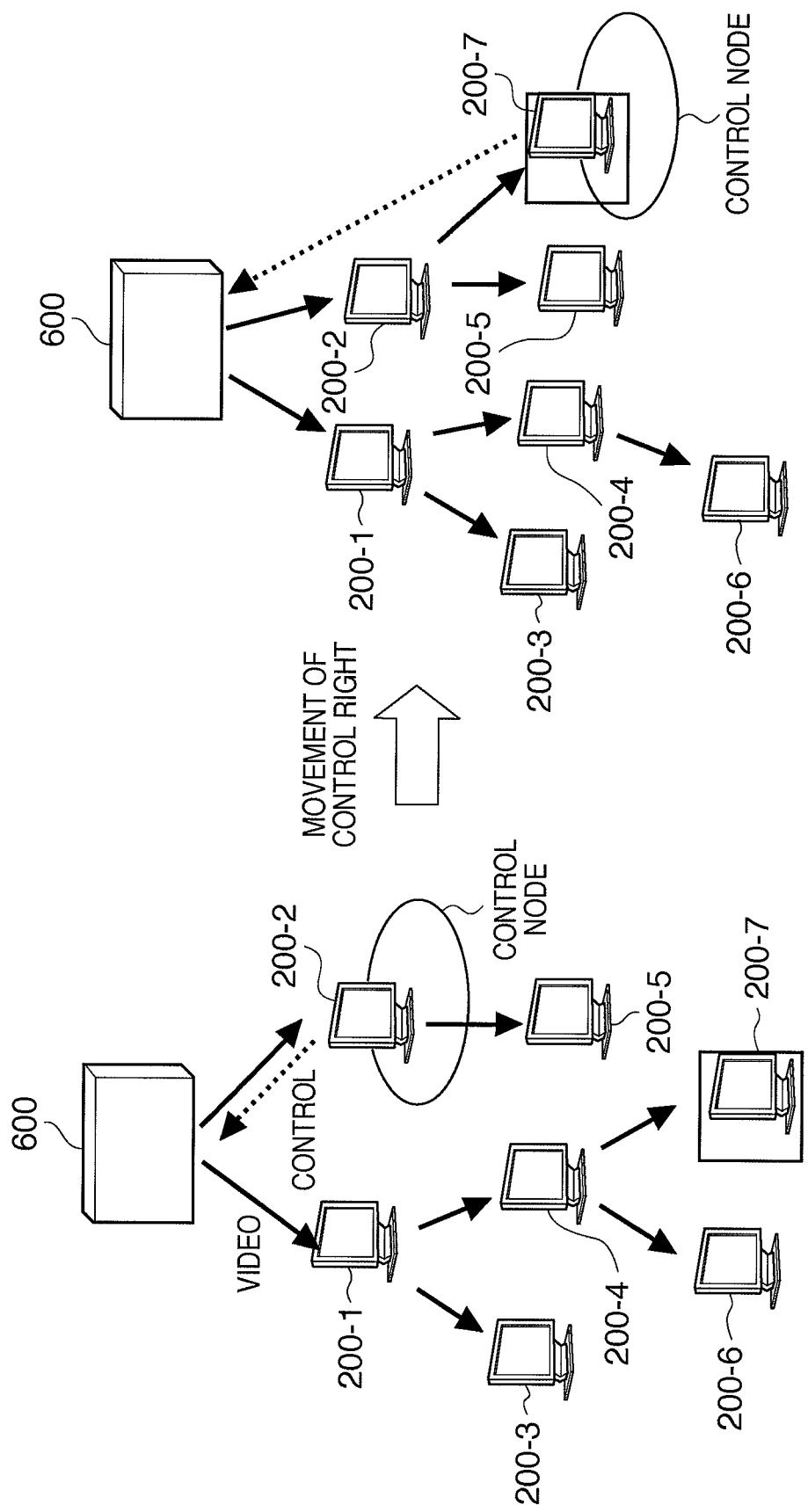
FIG. 9A / FIG. 9B

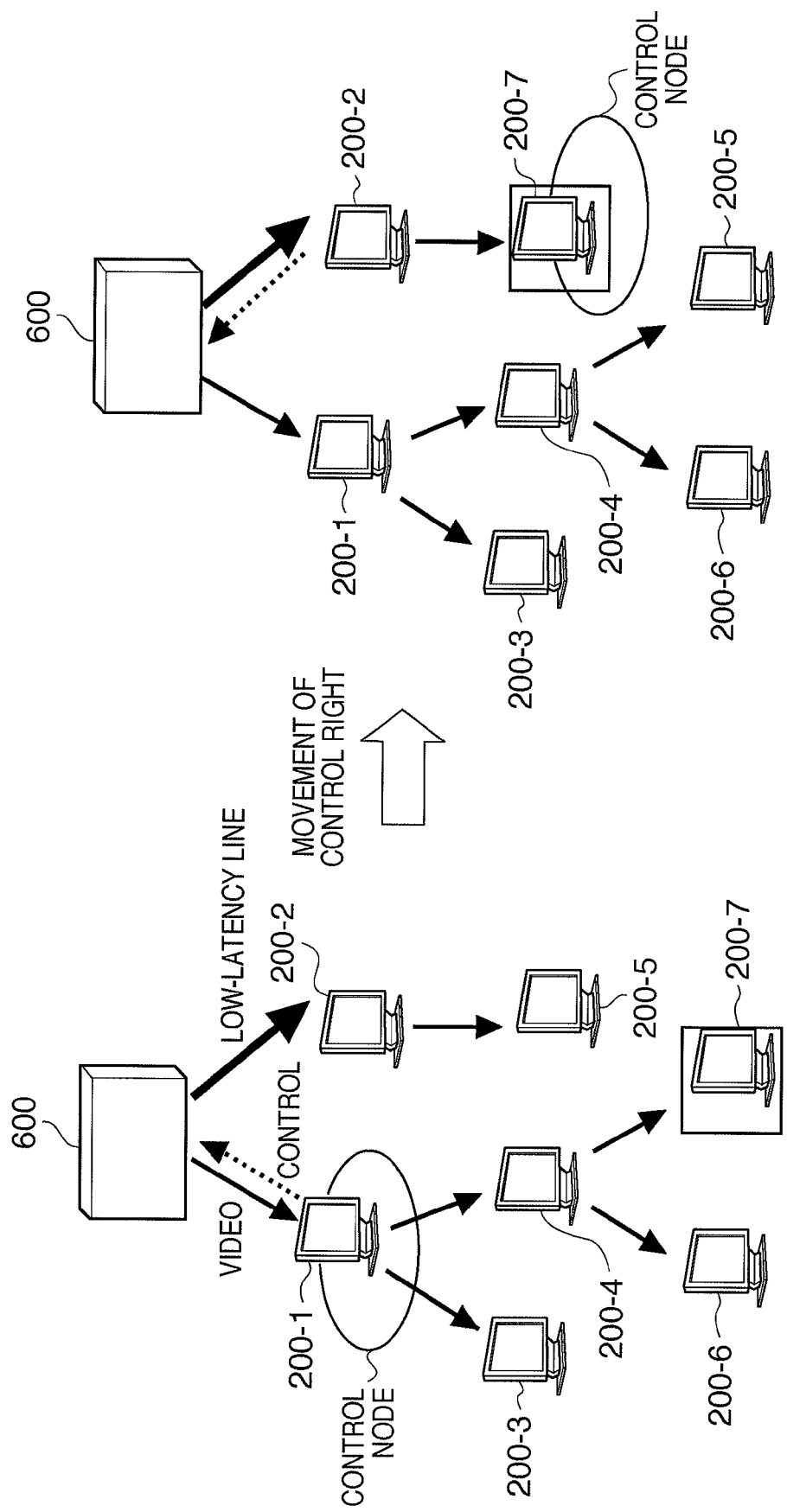

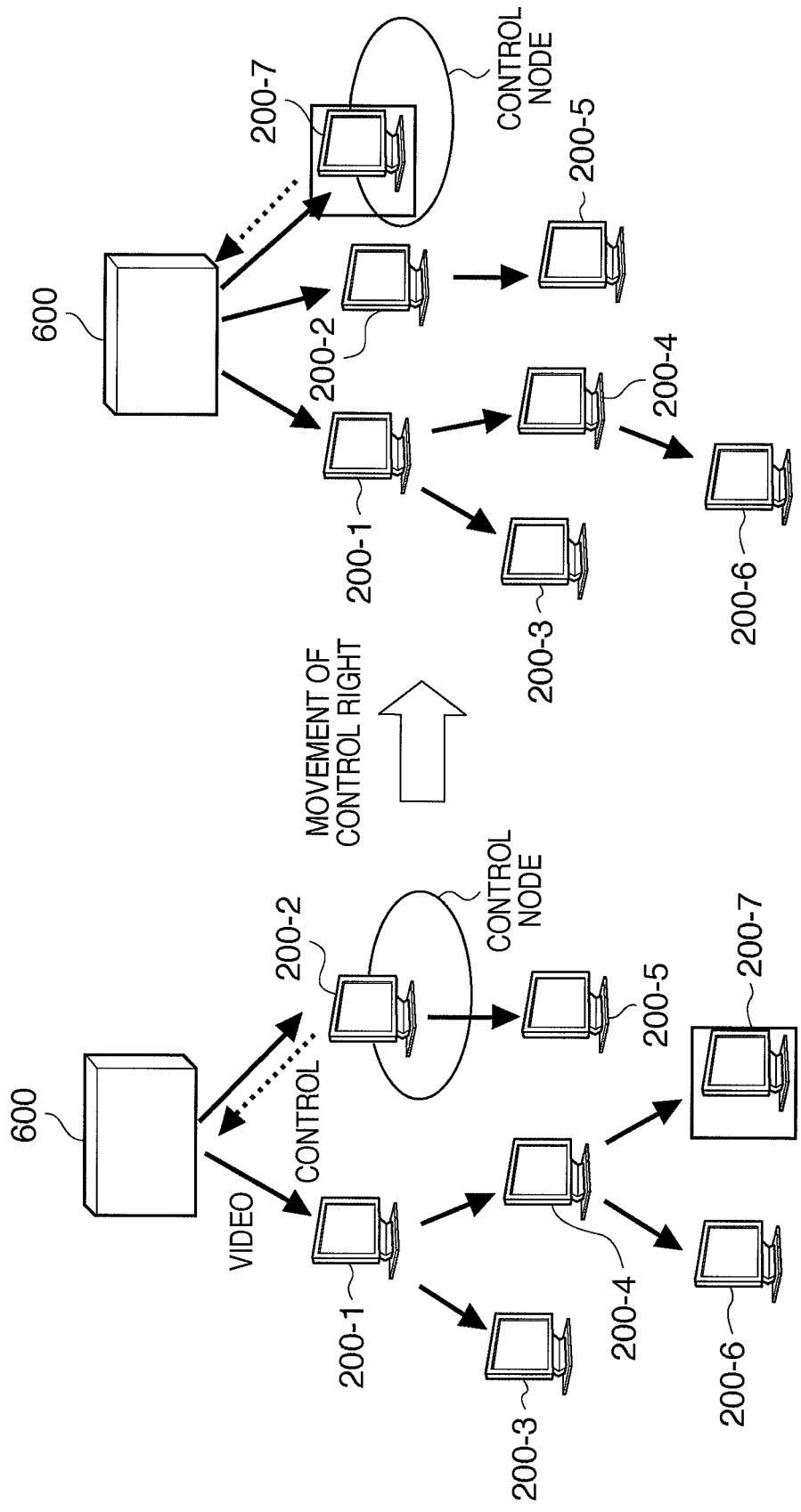

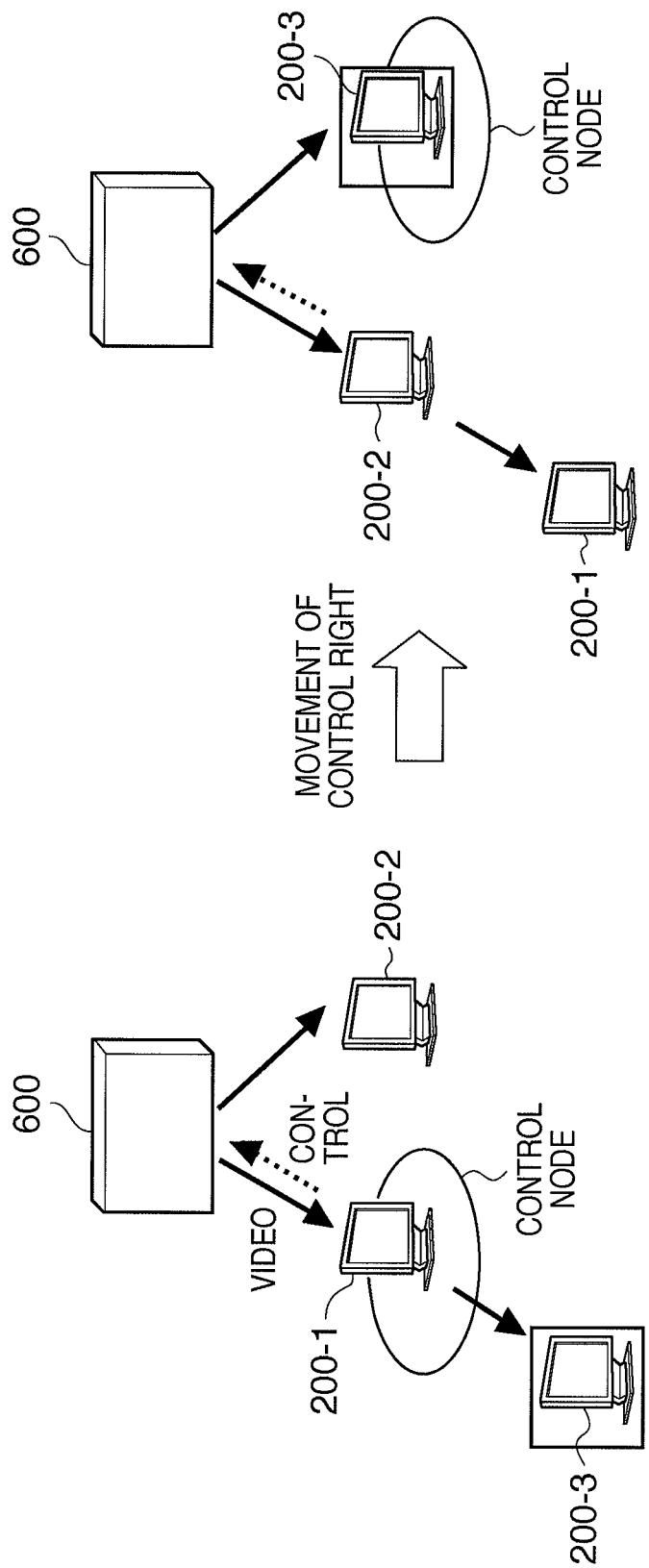

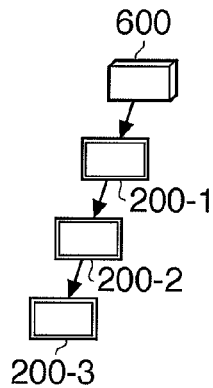
F I G. 13A
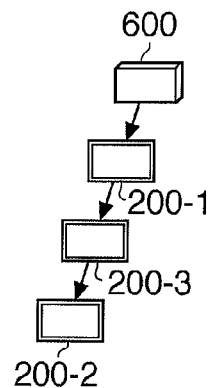
F I G. 13B
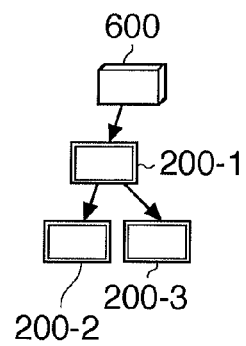
F I G. 13C
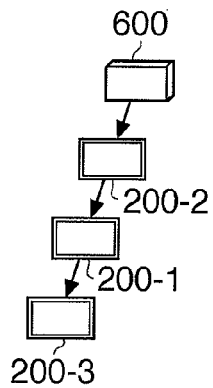
F I G. 13D
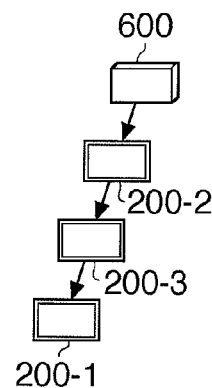
F I G. 13E
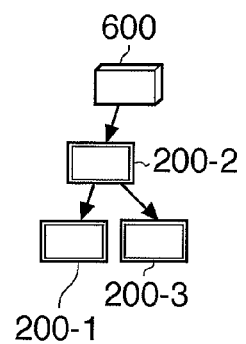
F I G. 13F
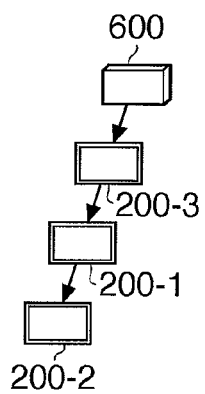
F I G. 13G
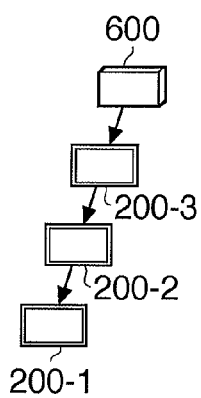
F I G. 13H
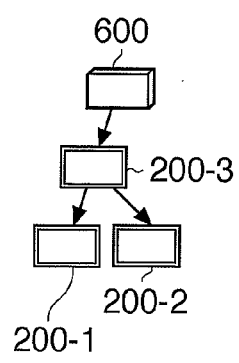
F I G. 13I

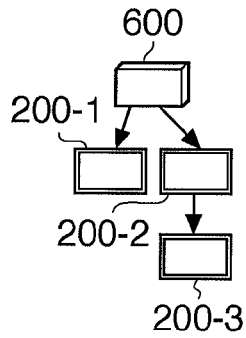
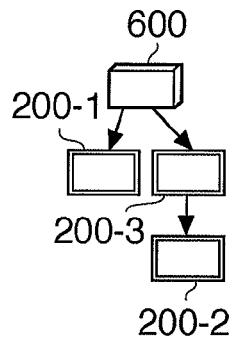
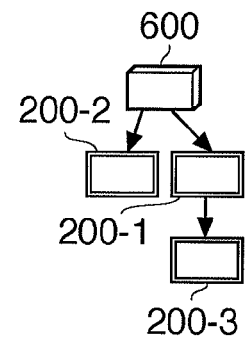
F I G. 13J    F I G. 13K    F I G. 13L
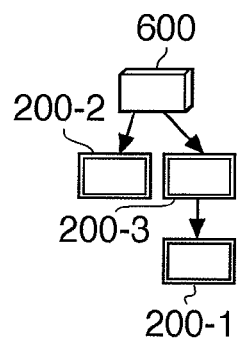
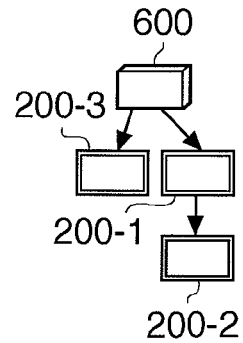
F I G. 13M    F I G. 13N
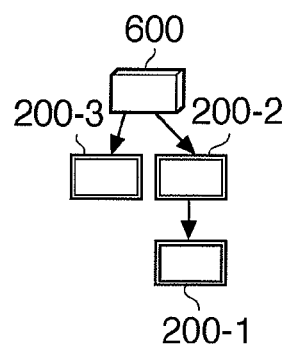
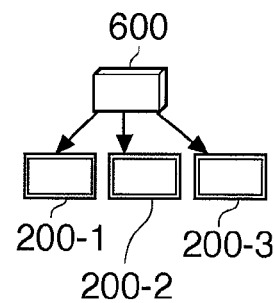
F I G. 13O    F I G. 13P

FIG. 14A

| | 600 | 200-1 | 200-2 | 200-3 |
|---|---|---|---|---|
| NUMBER OF SIMULTANEOUS TRANSMISSION SESSIONS | 2 | 2 | 2 | 1 |
| MAXIMUM PERMITTED DELAY VALUE (MS) | - | 500 | 600 | 900 |
| WITHDRAWAL/MALFUNCTION FREQUENCY (INSTANCES PER MILLION FRAMES) | - | 1 | 2 | 3 |

FIG. 14B

| | 600 ↔ 200-1 | 600 ↔ 200-2 | 600 ↔ 200-3 | 200-1 ↔ 200-2 | 200-2 ↔ 200-3 | 200-1 ↔ 200-3 |
|---|---|---|---|---|---|---|
| TRANSFER DELAY (MS) | 100 | 200 | 200 | 100 | 150 | 250 |
| FREQUENCY OF DROPPED FRAMES (PER MILLION FRAMES) | 10 | 20 | 30 | 30 | 40 | 50 |

FIG. 15

| | | \(a\) | \(b\) | \(c\) | \(d\) | \(e\) | \(f\) | \(g\) | \(h\) | \(i\) | \(j\) | \(k\) | \(l\) | \(m\) | \(n\) | \(o\) | \(p\) |
|---|---|---|---|---|---|---|---|---|---|---|---|---|---|---|---|---|---|
| | | | | | | | | | | DELIVERY TREE RECONSTRUCTION PATTERNS | | | | | | | |
| VIDEO DELIVERY DELAY (MS) | 200-1 | 100 | 100 | 100 | 300 | 600 | 300 | 350 | 550 | | 100 | 100 | 100 | 350 | 100 | 300 | |
| | 200-2 | 200 | 500 | 200 | 200 | 200 | 200 | 450 | 450 | | 200 | 450 | 200 | 200 | 200 | 200 | |
| | 200-3 | 450 | 250 | 250 | 450 | 450 | 450 | 200 | 200 | | 450 | 200 | 350 | 200 | 200 | 200 | |
| FREQUENCY OF DROPPED FRAMES (PER MILLION FRAMES) | 200-1 | 10 | 10 | 10 | 50 | | 50 | 70 | | | 10 | 10 | 10 | 70 | 10 | 50 | |
| | 200-2 | 40 | 100 | 40 | 20 | | 20 | 100 | | | 20 | 80 | 20 | 20 | 40 | 20 | |
| | 200-3 | 90 | 50 | 50 | 90 | | 70 | 30 | | | 70 | 30 | 50 | 30 | 30 | 30 | |
| VIDEO DROPOUT FREQUENCY (INSTANCES PER MILLION FRAMES) | 200-1 | 1 | 1 | 1 | 3 | | 3 | 4 | | | 1 | 1 | 1 | 4 | 1 | 3 | |
| | 200-2 | 3 | 6 | 3 | 2 | | 2 | 6 | | | 2 | 5 | 2 | 2 | 3 | 2 | |
| | 200-3 | 6 | 4 | 4 | 6 | | 5 | 3 | | | 5 | 3 | 4 | 3 | 3 | 3 | |
| EVALUATION FUNCTION OUTPUT VALUE | | 2716 5146 | 2422 2548 | | | 2501 5909 | | | | 1861 | 4191 1714 | | 2427 2325 | 2157 | | | |

F I G. 17

```
<?xml version="1.0">
<tree>
<node id="root">
  <node id="1">
    <node id="3"/>
    <node id="7" control="true">
      <node id="6"/>
      <node id="4"/>
    </node>
  </node>
  <node id="2">
    <node id="5"/>
  </node>
</node>
</tree>
```

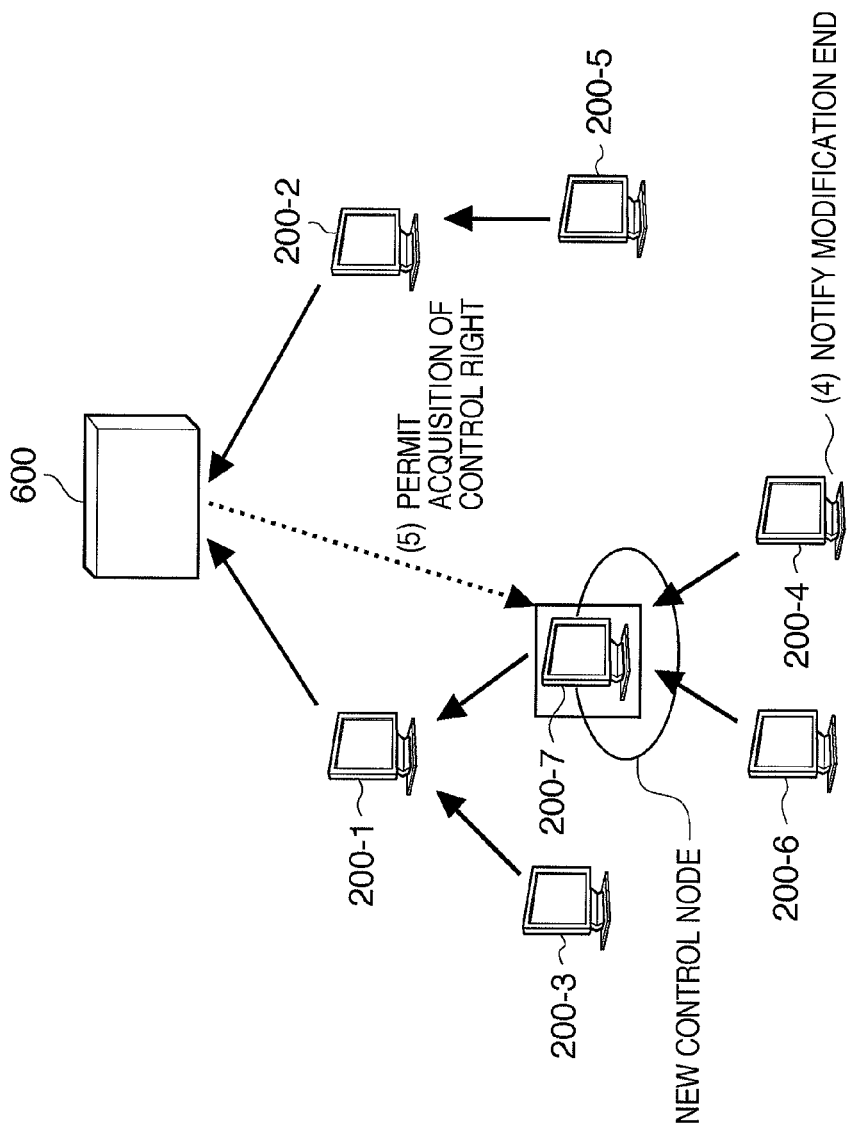

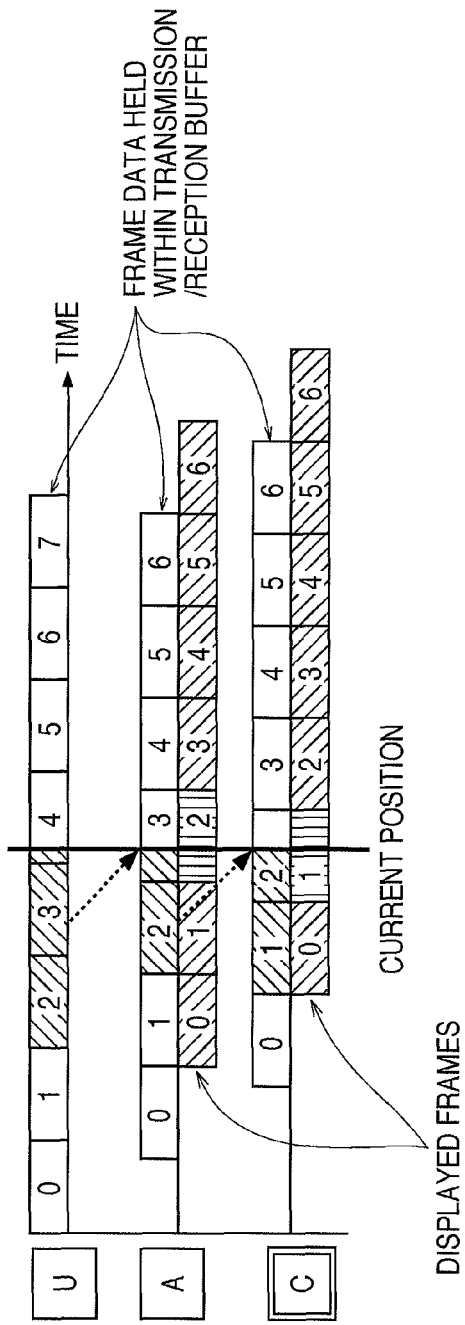
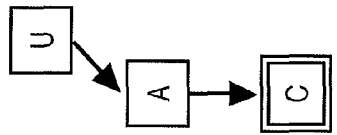
FIG. 24A
FIG. 24B

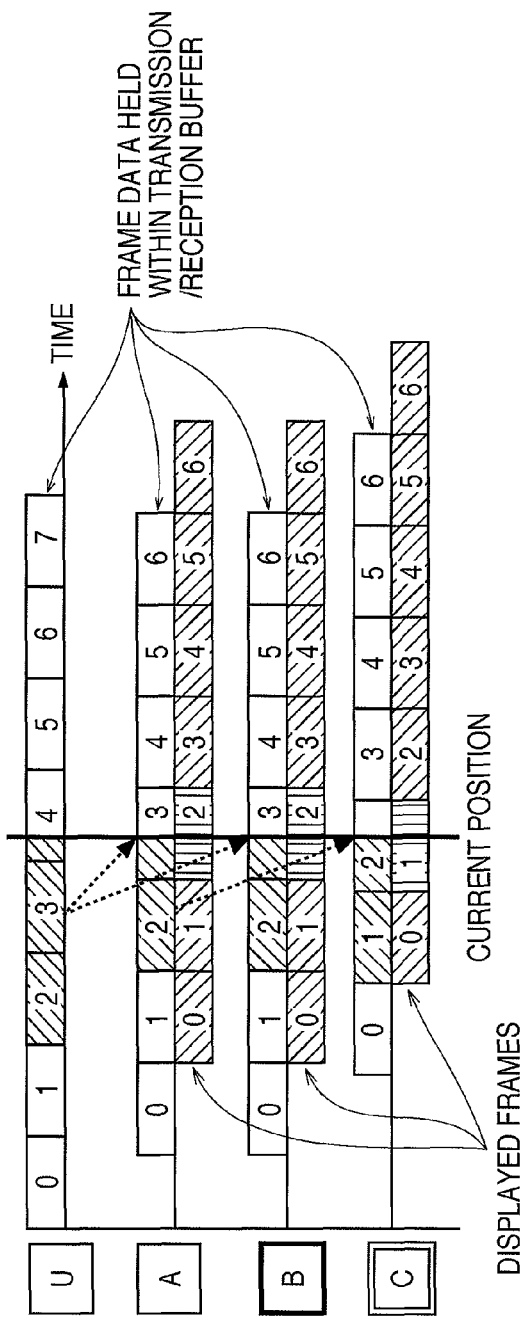
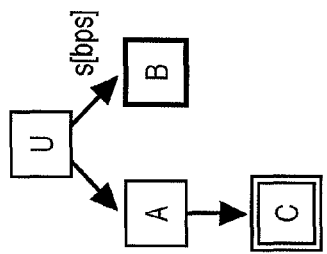

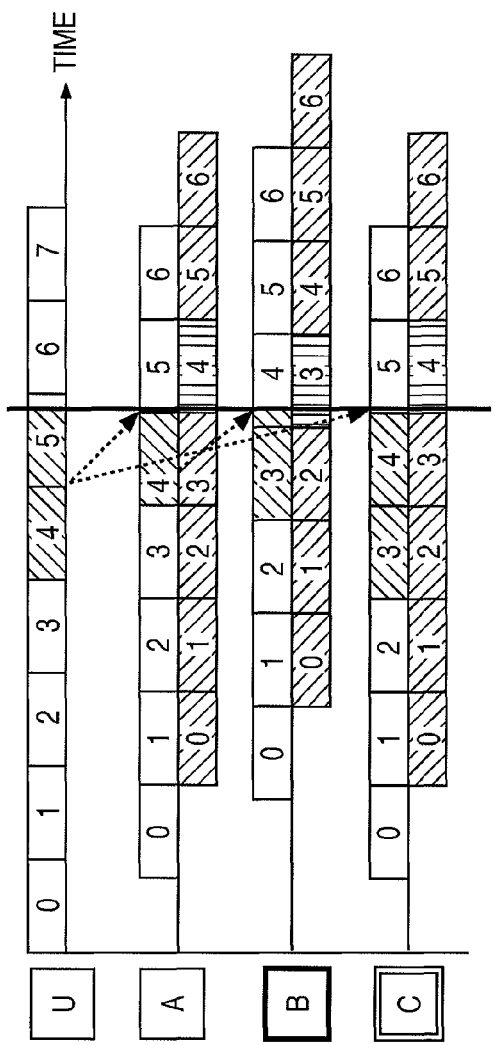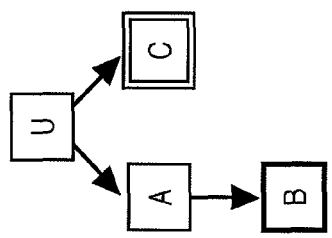

VIDEO DELIVERY APPARATUS AND METHOD

BACKGROUND OF THE INVENTION

1. Field of the Invention

The present invention relates to a video delivery apparatus and method.

2. Description of the Related Art

The recent digitalization of video capturing devices and the spread of broadband networks has led to an increase in demand for the real-time delivery of captured video to multiple display devices. However, when video data is delivered via unicast to each of the multiple display devices directly, the video delivery apparatus experiences concentrated access. Accordingly, multicasting techniques, which deliver data to multiple display devices simultaneously, are receiving attention.

IP multicast, in which path control and replication processes for data to be delivered are carried out at the IP (Internet Protocol) layer, is known as one scheme for implementing multicast communication. However, the kind of network infrastructure required to make IP multicast usable over a wide range has not yet become widespread. Furthermore, even in cases where IP multicast could be utilized, it would often be limited to closed networks within ISPs (Internet Service Providers).

For these reasons, application-layer multicast (ALM), in which path control and replication processes for data to be delivered are carried out at the application layer, is receiving more attention. With ALM, individual display devices perform relay processing on the data to be delivered while simultaneously performing display processing for the data to be delivered, transferring the data to be delivered through packet relay. Because the relay processing among nodes is performed through unicast, wide-range video broadcast delivery spanning across ISPs can be realized using the existing network infrastructure.

In ALM, a "logical flow of data", shown in FIG. 1B, is applied to a "physical flow of data" through routers, as shown in FIG. 1A. The logical flow of data has a tree structure with the root node at the apex thereof, and is thus called an "ALM delivery tree". In ALM, an application can change freely the logical network configuration by reconstructing the delivery tree.

A technique that uses ALM in the delivery of videoconference data is disclosed in US Patent Laid-Open No. 2006-029092 as a video broadcast delivery technique using ALM.

A video delivery system utilizing ALM has a property whereby display devices located on lower branches of the delivery tree experience a delayed video delivery time compared to display devices located on higher branches of the delivery tree. The reason for this is that the lower the branch, the more display devices the video must be relayed through before reaching the video delivery apparatus.

Therefore, there is a problem in that when an operator who is using a display device in a lower branch controls the video delivery apparatus so as to, for example, adjust the video parameters, the video resulting from that control cannot be immediately confirmed in the display device, resulting in poor operability.

SUMMARY OF THE INVENTION

According to an aspect of the present invention, the operability regarding the control of video delivery can be improved in a video delivery apparatus that delivers video data to multiple display devices based on a delivery tree.

According to another aspect of the present invention, it is possible to increase the speed of the video response to an operation of a video delivery apparatus in a display device that has a control right.

According to another aspect of the present invention, a video delivery apparatus is provided, the apparatus delivering video data to multiple display devices via a network in accordance with a delivery tree, and comprising: a vesting unit that vests a control right for adjusting parameters of the video data in one of the multiple display devices; and a modification unit that modifies the delivery tree so that the delivery delay of the video data to the display device in which the control right is vested by the vesting unit is reduced.

According to yet another aspect of the present invention, a video delivery method is provided, the method delivering video data from a video delivery apparatus to multiple display devices via a network in accordance with a delivery tree, and comprising the steps of: receiving an acquisition request for a control right for adjusting parameters of the video data from one of the multiple display devices; and modifying the delivery tree so that the delivery delay of the video data to the display device that requested the control right is reduced.

Further features of the present invention will become apparent from the following description of exemplary embodiments with reference to the attached drawings.

BRIEF DESCRIPTION OF THE DRAWINGS

FIG. 3 is a block diagram illustrating an example of the system configuration of a video delivery system according to an embodiment.

FIG. 4 is a block diagram illustrating an example of the system configuration of a video delivery system according to an embodiment.

FIGS. 5A, 5B, and 5C are diagrams illustrating examples of ALM delivery trees according to first, second, and third embodiments, respectively.

FIGS. 6A and 6B are diagrams illustrating an example of the reconstruction of an ALM delivery tree in accordance with the movement of a control right in a video delivery system according to an embodiment.

FIG. 7 is a diagram illustrating an example of a sequence for the reconstruction of an ALM delivery tree in accordance with the movement of a control right according to an embodiment.

FIGS. 8A and 8B are diagrams illustrating an example of the reconstruction of an ALM delivery tree in accordance with the movement of a control right in a video delivery system according to an embodiment, and illustrate an example of reconstruction so that a control node becomes the child node of a root node.

FIGS. 9A and 9B are diagrams illustrating an example of the reconstruction of an ALM delivery tree in accordance with the movement of a control right in a video delivery system according to an embodiment, and illustrate an example of reconstruction so that a control node connects as the grandchild node of a root node.

FIGS. 10A and 10B are diagrams illustrating an example of the reconstruction of an ALM delivery tree in accordance with the movement of a control right in a video delivery system according to an embodiment, and illustrate an example of reconstruction so that a low-latency line is used between a control node and a root node.

FIGS. 11A and 11B are diagrams illustrating an example of the reconstruction of an ALM delivery tree in accordance with the movement of a control right in a video delivery system according to an embodiment, and illustrate an example of reconstruction so that a control node connects as a terminal node.

FIGS. 12A and 12B are diagrams illustrating an example of the reconstruction of an ALM delivery tree in accordance with the movement of a control right in a video delivery system according to an embodiment, and illustrate an example of reconstruction so that the video delivery delay is minimized.

FIGS. 13A to 13P are diagrams illustrating reconstruction pattern candidates for the delivery tree.

FIGS. 14A and 14B are tables indicating various parameters for each node and between nodes.

FIG. 15 is a table illustrating the video delivery delay, degree of instability in the video, and the result of calculating an evaluation function output value, for each delivery tree pattern.

FIG. 17 is a diagram illustrating an example of delivery tree data.

FIG. 19 is a diagram illustrating an example of a collaboration (when making a notification regarding the end of modification) when reconstructing a delivery tree according to an embodiment.

FIGS. 24A and 24B are diagrams illustrating an example of the delivery state of data in the case where a node moves upward as a result of reconstruction (immediately before reconstruction) according to an embodiment.

FIGS. 28A and 28B are diagrams illustrating an example of the delivery state of data in the case where two nodes have switched places as a result of reconstruction (a normal state) according to an embodiment.

FIGS. 31A and 31B are diagrams illustrating an example of the delivery state of data in the case where two nodes have switched places as a result of reconstruction (immediately after reconstruction) according to an embodiment.

DESCRIPTION OF THE EMBODIMENTS

Hereinafter, preferred embodiments of the present invention shall be described with reference to the accompanying drawings.

Figure 1A:
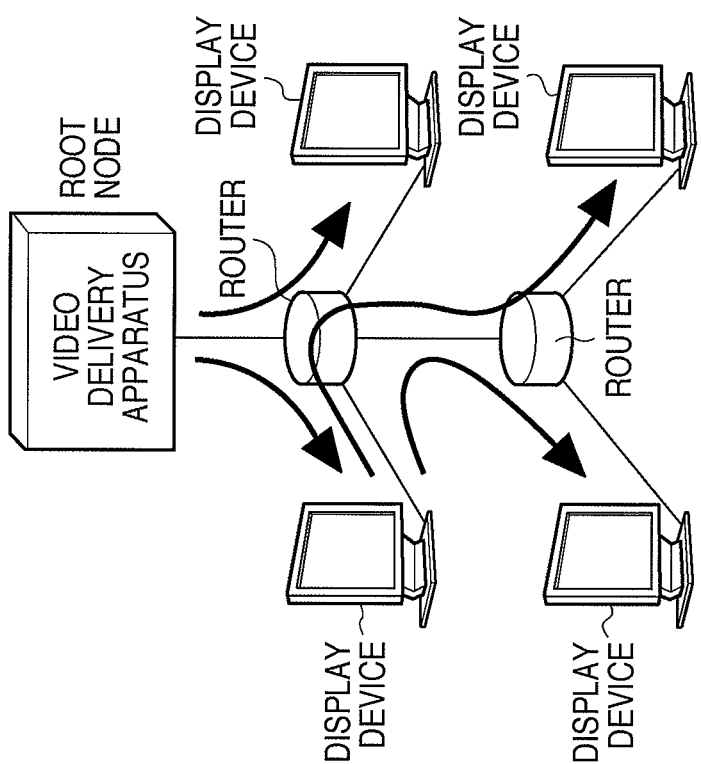
FIGS. 1A and 1B are diagrams illustrating data flows according to application-layer multicast (ALM).
Figure 1B:
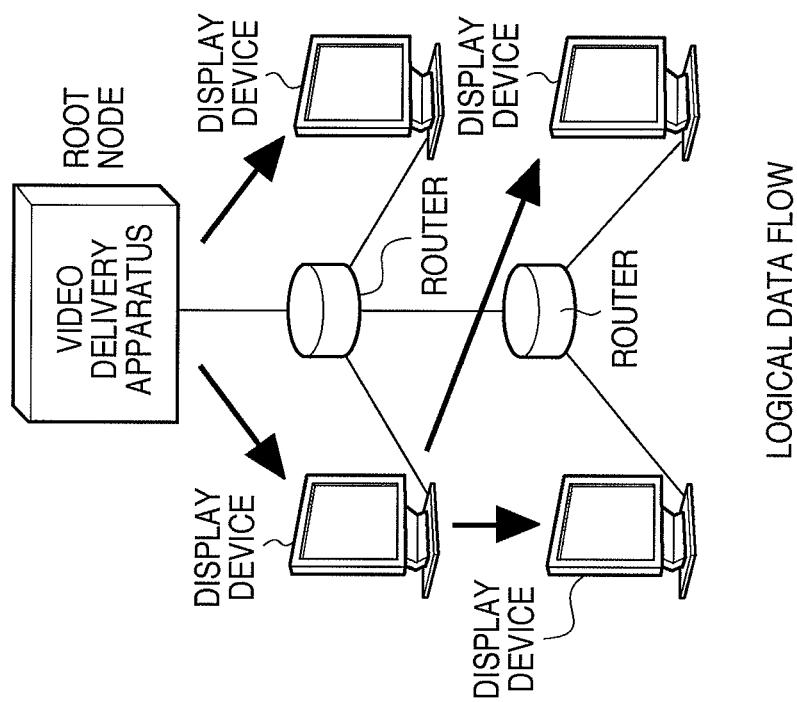
Figure 2:
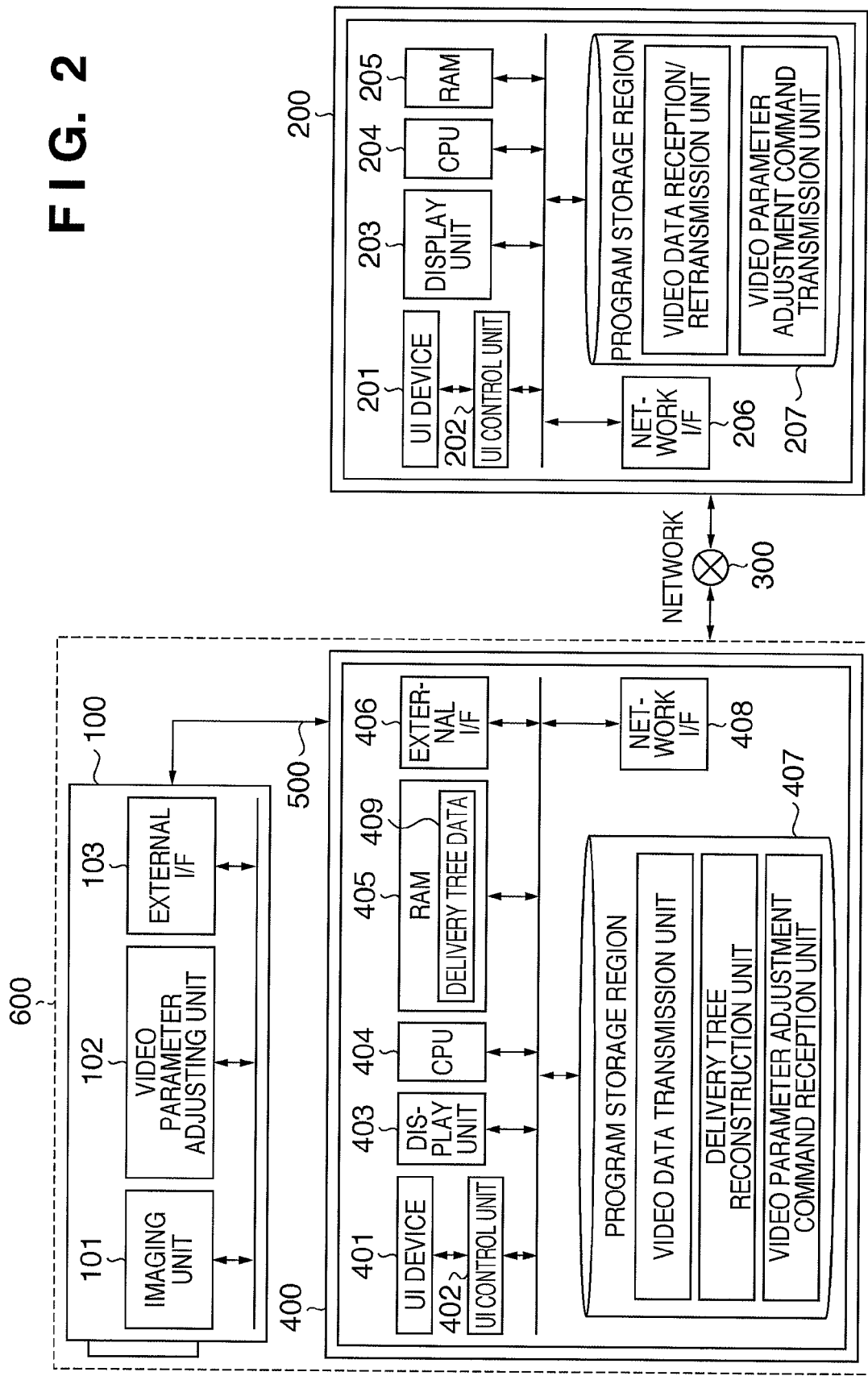
FIG. 2 is a block diagram illustrating an example of the system configuration of a video delivery system according to an embodiment.

FIG. 2 is a block diagram illustrating an example of the system configuration of a video delivery system according to an embodiment. A video delivery apparatus 600 according to a first embodiment includes an imaging apparatus 100 that has an imaging function and a video parameter adjusting function, and a display delivery apparatus 400, connected to the imaging apparatus 100 via a communication line 500, that has a display function and a video data delivery function. The video delivery apparatus 600 is connected to multiple display devices 200 via a network 300. Video captured by the imaging apparatus 100 is delivered by the display delivery apparatus 400 in real-time to the display devices 200.

The imaging apparatus 100 includes an imaging unit 101 that has a driving system, and optical system, and so on, and a video parameter adjusting unit 102 that controls the imaging unit 101. Here, the video parameters refer to, for example:

driving system control, including the pan angle, tilt angle, and zoom ratio;

optical system control, including white balance, brightness, saturation, aperture, ISO sensitivity; and video quality control, including video size, color depth, encoding format, and compression level.

The video parameter adjusting unit 102 adjusts the imaging unit 101, corrects the video data, and so on in accordance with these parameters.

The imaging apparatus 100 is connected to the display delivery apparatus 400 through the communication line 500 using an external IF 103. USB (Universal Serial Bus) can be given as an example of the connection method.

A UI device 401, which is a user interface, is connected to the display delivery apparatus 400. The UI device 401 has a light-emitting diode or liquid-crystal panel that displays the device's status, processing details, and so on, as well as a remote controller, various buttons, and so on for providing operational instructions to the apparatus. The UI device 401 is connected to a CPU 404 via a UI control unit 402, and performs various functions under the control of the CPU 404. For example, a user can adjust the video parameters by using the UI device 401. Video parameter adjustment commands provided by the user via the UI device 401 are imported into the CPU 404 via the UI control unit 402 and transmitted to the imaging apparatus 100 through the communication line 500.

A display unit 403 displays video data sent by the imaging apparatus 100 through the communication line 500. Furthermore, the display delivery apparatus 400 is connected to the network 300 via a network IF 408. Multiple display devices 200 are connected to the network 300. Under the control of the CPU 404, the video data sent through the communication line 500 is sent to the display devices 200 over the network 300. Furthermore, the display delivery apparatus 400 receives video parameter adjustment commands transmitted by the display devices 200 over the network 300, and transfers those commands to the imaging apparatus 100 through the communication line 500.

Furthermore, the display delivery apparatus 400 has a program storage region 407. To be specific, the program storage region can be realized using a hard disk, a flash memory, or the like. Furthermore, the display delivery apparatus 400 has the CPU 404 and a RAM 405, and various types of control, calculations, the transmission and reception of video data, and so on within the apparatus are executed by the CPU 404 interpreting and executing programs loaded into the RAM 405 from the program storage region 407.

Furthermore, delivery tree data 409 expressing the structure of an ALM delivery tree is stored in the RAM 405, and video data is delivered to the display devices 200 in accordance with this delivery tree data 409. In other words, the delivery tree data 409 indicating a delivery tree in which the video delivery apparatus 600 (or the display delivery apparatus 400) is taken as a root node and the multiple display devices 200 are taken as child and grandchild nodes thereof is saved within the RAM 405.

The functionality of a video data transmitting unit, a delivery tree reconstruction unit, and a video parameter adjustment command reception unit is implemented by the CPU 404 executing the programs stored in the program storage region 407. The video data transmitting unit delivers video data obtained by the imaging apparatus 100 or video data stored in a storage unit (not shown) to the display devices via the network IF 408. The delivery tree reconstruction unit reconstructs the delivery tree based on the movement of a control right (the right to control video parameter adjustments and the like) among display devices. Details of the delivery tree reconstruction process shall be given later.

The video parameter adjustment command reception unit receives video parameter adjustment commands via unicast from the display device that has the control right, and notifies the video parameter adjusting unit 102 of the received video parameters.

Each display device 200 has a UI device 201, which is a user interface. The UI device 201 has a light-emitting diode or liquid-crystal panel that displays the device's status, processing details, and so on, as well as a remote controller, various buttons, and so on for providing operational instructions to the apparatus. The UI device 201 is connected to a CPU 204 via a UI control unit 202, and performs various functions under the control of the CPU 204. Therefore, a user can adjust the video parameters of the video delivery apparatus 600 by using the UI device 201. The video parameter adjustment commands generated by a display device 200 are transmitted to the video delivery apparatus 600 over the network 300, which is connected to a network IF 206.

Each display device 200 has a display unit 203, which displays video data sent over the network 300. Each display device 200 has a program storage region 207. To be specific, the program storage region 207 can be realized using a hard disk, a flash memory, or the like. Furthermore, each display device 200 has the CPU 204 and a RAM 205, and various types of control, calculations, the transmission and reception of video data, and so on within the device can be performed by the CPU 204 interpreting and executing programs loaded into the RAM 205 from the program storage region 207.

The functionality of a video data reception/retransmission unit and a video parameter adjustment command transmission unit is implemented by the CPU 204 executing the programs stored in the program storage region 207. The video data reception/retransmission unit receives video data from the video delivery apparatus 600 or from a display device connected above itself in the delivery tree, and retransmits the received video data to display devices connected below itself. From which apparatus the video data is received and to which apparatus the video data is to be transmitted is determined based on the delivery tree data 409, which expresses the structure of the ALM delivery tree. A hierarchical video data transmitting unit delivers video data obtained by the imaging apparatus 100 or video data stored in a storage unit (not shown) to the display devices via the network IF 408.

In the case where its own device has the control right, the video parameter adjustment command transmission unit can transmit video parameter adjustment commands inputted via the UI device 201 to the video delivery apparatus 600 via unicast.

FIG. 5A illustrates an example of an ALM delivery tree constructed based on the delivery tree data 409 by the video delivery system according to a first embodiment. Video data generated by the imaging apparatus 100 is delivered by the display delivery apparatus 400 to each of the display devices 200 in accordance with this ALM delivery tree. In the example shown in FIG. 5A, first, the video data is transmitted from the display delivery apparatus 400 to the display devices 200-1 and 200-2. Next, the video data is transmitted from the display device 200-1 to the display devices 200-3 and 200-4, and from the display device 200-2 to the display device 200-5.

Control data, including video parameter adjustment commands, is transmitted via unicast from the control node (display device) that acquired the control right, which is a right for preferential control of the video parameter adjusting function of the imaging apparatus 100. In this example, the display device 200-5 is the control node, and the control data configured of the video parameter adjustment commands is transmitted to the display delivery apparatus 400 via unicast.

Next, a process for reconstructing the ALM delivery tree performed by the video delivery system of the first embodiment in accordance with the movement of the control right shall be described using FIGS. 6A and 6B. FIG. 6A illustrates the ALM delivery tree prior to the movement of the control right, where the display device 200-5 has the control right. FIG. 6B, meanwhile, illustrates the ALM delivery tree after the movement of the control right, where the display device 200-7 has the control right. In other words, in the examples in FIGS. 6A and 6B, the display device 200-5 is the display device from which the movement of the control right begins, and the display device 200-7 is the display device at which the movement of the control right ends.

In the first embodiment, the ALM delivery tree is reconstructed so as to reduce the number of relay nodes between the display device 200-7, which is the control node, and the video delivery apparatus 600, which is the root node, in accordance with the movement of the control right. When the display devices are then reconnected based on the reconstructed ALM delivery tree, the video delivery delay at the control node is reduced.

For example, there are two relay nodes between the display device 200-7 and the video delivery apparatus 600 in FIG. 6A, but there is only one relay node between the display device 200-7 and the video delivery apparatus 600 in FIG. 6B. Although FIGS. 6A and 6B illustrate an example in which the control right has moved to the display device 200-7, the ALM delivery tree reconstruction and reconnection is also performed so that the number of relay nodes between the display device that has the control right and the video delivery apparatus is reduced in cases where the control right has moved to other display devices.

Note that in the system of the first embodiment, the display delivery apparatus 400 is also capable of acquiring the control right, as shown in FIGS. 2 and 5A. However, in this case, because there is no video delivery delay between the display delivery apparatus 400 and the root node, the ALM delivery tree is not reconstructed.

A sequence for the example of delivery tree reconstruction shown in FIGS. 6A and 6B shall be illustrated next using FIG. 7.

When a user commences control of the imaging apparatus 100 using the display device 200-7, the display device 200-7 makes a request for acquiring the control right to the video delivery apparatus 600.

Having received the request, the video delivery apparatus 600 determines whether or not to vest the display device 200-7 with the control right. If the video delivery apparatus 600 has determined to vest the display device 200-7 with the control right, it notifies the display device 200-7 of the vesting of the control right, and furthermore, executes a delivery tree reconstruction process S1. The video delivery apparatus 600 then notifies the display devices 200 of the results of the ALM delivery tree reconstruction.

When, in the delivery tree reconstruction process, the control right moves to a different display device, the display device to which the control right has moved becomes a control node. The delivery tree data is then updated to as to reduce the video delivery delay between the root node and the control node, and the delivery tree for the video data delivery is modified.

The display device 200 that received the notification of the ALM delivery tree reconstruction results, which includes the updated delivery tree data 409, executes a video data transmitter/recipient modification process S2, and notifies the video delivery apparatus 600 when the modification has ended. The video delivery apparatus 600 is notified of the end of this modification by each of the display devices through, for example unicast. Alternatively, as shall be described later in a tenth embodiment, the notification may be made using the updated delivery tree.

Having received notifications that the modification has ended from all the display devices, the video delivery apparatus 600 notifies the display device 200-7 that it is permitted to acquire the control right, and the display device 200-7 can then transmit video parameter adjustment commands.

Note that the present invention can also be applied to the delivery of video that has been stored, and is not limited to the delivery of video that has been captured. In addition, the present invention is not limited to application-layer multicast (ALM), and can generally be applied to delivery schemes that use delivery trees. Furthermore, the delivered data is not limited to video data, and may be, for example, audio data that is played back as a stream.

In other words, the present invention can be applied to a data delivery system in which a data delivery apparatus is connected to multiple playback apparatuses that function as delivery relay devices, thereby implementing a data delivery system that reduces the delay of data delivery to the playback apparatus that has a control right.

While the display delivery apparatus 400 of the first embodiment has the UI device 401 and the display unit 403, these elements may be omitted. A second embodiment illustrates an example that uses a delivery apparatus configured by removing the UI (UI device 401, UI control unit 402) and the display unit 403 from the display delivery apparatus 400 used in the first embodiment.

FIG. 3 is a block diagram illustrating an example of the system configuration of a video delivery system according to the second embodiment. A delivery apparatus 410 provided in a video delivery apparatus 610 has neither a UI nor a display unit, as described above. Other constituent elements of the video delivery apparatus 610 are the same as those described in the first embodiment (see FIG. 2). Furthermore, the details of the display devices 200 are identical to those of the first embodiment (see FIG. 2), and thus descriptions thereof shall be omitted. FIG. 5B illustrates an example of an ALM delivery tree constructed using the video delivery system according to the second embodiment.

The second embodiment can be thought of as the display delivery apparatus 400 of the first embodiment, but with the control right acquisition function and the video data display function removed; thus the ALM delivery tree reconstruction process of the display device based on the movement of the control right is identical to that described in the first embodiment.

In a third embodiment, an imaging and delivery apparatus, which is an imaging apparatus provided with the functionality of the delivery apparatus 410 used in the second embodiment, is used.

FIG. 4 is a block diagram illustrating an example of the system configuration of a video delivery system according to the third embodiment. A video delivery apparatus 620 has an imaging and delivery apparatus 110 provided with the video delivery function that the delivery apparatus 410 of the second embodiment has. Note that the details of the display devices 200 are identical to those of the first embodiment (see FIG. 2), and thus descriptions thereof shall be omitted. FIG. 5C illustrates an example of an ALM delivery tree constructed using the video delivery system according to the third embodiment.

The third embodiment can be thought of as the functionality of the communication line 500 of the second embodiment (see FIG. 3) being replaced by the wiring within the imaging and delivery apparatus 110 shown in FIG. 4. Furthermore, the ALM delivery tree reconstruction process of the display device based on the movement of the control right is identical to that described in the first embodiment.

Next, a fourth embodiment describes the ALM delivery tree reconstruction process performed in a video delivery system constructed using one of the video delivery apparatuses illustrated in the first through third embodiments. However, the following descriptions shall discuss a video delivery system that uses a video delivery apparatus 600 as an example.

In the reconstruction process performed by the delivery tree reconstruction unit according to the fourth embodiment, the video delivery apparatus 600 reconstructs the ALM delivery tree so that the control node becomes a child node of the root node. A method for reconstructing the delivery tree performed in accordance with the movement of the control right according to the fourth embodiment shall be described using FIGS. 8A and 8B. FIG. 8A illustrates the state of an ALM delivery tree before the movement of the control right, where the display device 200-2 has the control right. FIG. 8B, meanwhile, illustrates the state of the ALM delivery tree after the movement of the control right, where the display device 200-4 has the control right. In fourth embodiment, the video delivery apparatus 600 reconstructs the ALM delivery tree in accordance with the movement of the control right. The video delivery apparatus 600 then places the display device 200-4, to which the control node moves, directly under the video delivery apparatus 600, which is the root node, making the display device 200-4 a child node. The ALM delivery tree reconstruction is implemented by the delivery tree reconstruction unit updating the delivery tree data 409 and then notifying the display devices of this update.

By executing the delivery tree reconstruction process as described above, the number of relay nodes leading up to the display device 200-4, which is the control node, is reduced to zero. Accordingly, it is possible to reduce the video delivery delay at the control node.

Next, a fifth embodiment describes an ALM delivery tree reconstruction process that is different from that of the fourth embodiment, performed in a video delivery system illustrated in the first through third embodiments. However, the following descriptions shall discuss a video delivery system that uses a video delivery apparatus 600 as an example.

In the ALM delivery tree reconstruction described in the fourth embodiment, the reconstruction is performed so that the control node becomes a child node of the root node. However, because such a scheme increases the number of child nodes relative to the root node, it cannot be employed in a situation where the number of simultaneous transmission sessions of the root node is insufficient. Therefore, the delivery tree reconstruction unit according to the fifth embodiment reconstructs the ALM delivery tree so that the control node becomes a grandchild node directly under a child node that is in turn directly under the root node in the case where the number of simultaneous transmission sessions of the root node is insufficient.

A method for reconstructing the delivery tree performed in accordance with the movement of the control right according to the fifth embodiment shall be described using FIGS. 9A and 9B. In FIGS. 9A ad 9B, it is assumed that the number of simultaneous transmission sessions of the video delivery apparatus 600 is two, and that the number of child nodes will not be increased. FIG. 9A illustrates the state of an ALM delivery tree before the movement of the control right, where the display device 200-2 has the control right. FIG. 9B, meanwhile, illustrates the state of the ALM delivery tree after the movement of the control right, where the display device 200-7 has the control right.

As described above, the number of simultaneous transmission sessions of the video delivery apparatus 600 is two, and thus the display device 200-7, to which the control right is moved, cannot play the role of a child node. Accordingly, the video delivery apparatus 600 reconstructs the ALM delivery tree so that the display device 200-7, which is the control node, becomes a grandchild node of the video delivery apparatus 600, which is the root node. This reconstruction reduces the number of relay nodes leading up to the display device 200-7 from two to one, thereby reducing the video delivery delay at the control node.

Note that the purpose of the present embodiment can also be achieved by replacing a current child node with a new control node.

Next, a delivery tree reconstruction process according to a sixth embodiment shall be described. The delivery tree reconstruction process according to the sixth embodiment can also be applied to the video delivery systems illustrated in the first through third embodiments, in the same manner as the above embodiments.

The delivery tree reconstruction unit of the sixth embodiment reconstructs the ALM delivery tree so that a low-latency line is used in the path between the control node and the root node. A method for reconstructing the delivery tree performed in accordance with the movement of the control right according to the sixth embodiment shall be described using FIGS. 10A and 10B.

A low-latency line is connected between the video delivery apparatus 600 and the display device 200-2 in FIGS. 10A and 10B. FIG. 10A illustrates the state of an ALM delivery tree before the movement of the control right, where the display device 200-1 has the control right. FIG. 10B, meanwhile, illustrates the ALM delivery tree after the movement of the control right, where the display device 200-7 has the control right. In the sixth embodiment, the ALM delivery tree is reconstructed in accordance with the movement of the control right so that a low-latency line is used between the display device 200-7, which becomes the control node, and the video delivery apparatus 600, which is the root node. Through this, the display devices are reconnected so that the video delivery delay at the display device 200-7 is reduced.

Next, a delivery tree reconstruction process according to a seventh embodiment shall be described. The delivery tree reconstruction process according to the seventh embodiment can also be applied to the video delivery systems illustrated in the first through third embodiments, in the same manner as the above embodiments.

The delivery tree reconstruction unit of the seventh embodiment reconstructs the ALM delivery tree so that, in the case where the data transmission/reception capabilities of the control node are lower than a predetermined standard, the control node becomes a terminal node within a range in which the video delivery delay occurring between the control node and the root node is reduced. In the seventh embodiment, it is assumed that the video delivery apparatus 600 has acquired capability information from the display devices 200, which are the nodes, in advance.

Next, a process for reconstructing the delivery tree performed by the system of the seventh embodiment in accordance with the movement of the control right shall be described using FIGS. 11A and 11B. FIGS. 11A and 11B assume that the display device 200-7, to which the control right moves, is a portable terminal or the like whose transmission/reception capabilities are lower than a predetermined standard, and is thus a node that is not suited to being connected to by a child node. FIG. 11A illustrates the delivery tree before the movement of the control right, where the display device 200-2 has the control right. FIG. 11B, meanwhile, illustrates the delivery tree after the movement of the control right, where the display device 200-7 has the control right.

In the seventh embodiment, the ALM delivery tree is reconstructed in accordance with the movement of the control right, so that the display device 200-7, which is the control node, becomes a child node of the video delivery apparatus 600, which is the root node. This reconstruction not only reduces the number of relay nodes between the display device 200-7 (the control node) and the video delivery apparatus to zero, but also reduces the amount of influence on other display devices by setting the display device 200-7 as a terminal node.

Next, a delivery tree reconstruction process according to an eighth embodiment shall be described. The delivery tree reconstruction process according to the eighth embodiment can also be applied to the video delivery systems illustrated in the first through third embodiments, in the same manner as the above embodiments.

In the delivery tree reconstruction process used in the eighth embodiment, the ALM delivery tree is reconstructed so that the video delivery delay between the control node and the root node is minimized, using the number of simultaneous transmission sessions and maximum permissible delay value in each of the nodes as constraint conditions.

Here, in the case where multiple ALM delivery trees whose video delivery delay is to be minimized, the delivery tree reconstruction unit of the video delivery apparatus determines a reconstruction pattern using an evaluation function that takes the video delivery delay and degree of video instability at each node as parameters. In other words, when there are multiple candidates for a delivery tree reconstruction pattern, the delivery tree reconstruction unit selects the reconstruction pattern in which the post-reconstruction evaluation function output value (evaluation value) is the lowest.

Next, a process for reconstructing the delivery tree performed by the system of the eighth embodiment in accordance with the movement of the control right shall be described using FIGS. 12A and 12B. FIG. 12A illustrates the delivery tree before the movement of the control right, where the display device 200-1 has the control right. The manner in which the delivery tree reconstruction unit of the eighth embodiment selects a delivery tree reconstruction pattern in the case where the display device 200-3 has acquired the control right shall be described hereinafter.

As illustrated by FIGS. 13A to 13P, there are 16 total patterns for delivery tree combinations in the eighth embodiment. Furthermore, the number of possible simultaneous transmission sessions and maximum permissible delay values for each node are as shown in FIG. 14A, whereas the transfer delay between nodes is as shown in FIG. 14B.

The "video delivery delay" in FIG. 15 refers to a value obtained by totaling the transfer delays from the video delivery apparatus 600, which is the root node, up to each of the display devices, and is calculated by the delivery tree reconstruction unit of the eighth embodiment referring to the transfer delays shown in FIG. 14B. Here, the pattern in FIG. 13I exceeds the number of possible simultaneous transmission sessions of the display device 200-3, whereas the pattern in FIG. 13P exceeds the number of possible simultaneous transmission sessions of the video delivery apparatus 600, and thus these patterns are removed from the patterns that are searched. Furthermore, the patterns in FIGS. 13E and 13H exceed the maximum permissible delay value of the display device 200-1, and are thus removed from the patterns that are searched.

Among the remaining patterns, the patterns in which the video delivery delay of the display device 200-3, which is the control node, is the lowest are the patterns in FIGS. 13G, K, M, N, and O. Here, in, for example, the case where a single delivery tree has been identified, the identified delivery tree is used. However, because five patterns have been identified in the present example, a pattern is selected using an evaluation function.

FIG. 14A indicates the frequency of malfunctions, withdrawal from the delivery group, and so on (withdrawal/malfunction frequency). FIG. 14B, meanwhile, indicates the frequency of dropped frames between nodes. The evaluation function used in the eighth embodiment is shown below. It should be noted that the weighting values in the equation for each parameter in each device can be determined through, for example, trial and error on the part of the system's designer.

$$E=(d_1+10f_1+20v_1)+(d_2+40f_2+8v_2)+(d_3+2f_3+7v_3)$$

$d_n$: the video delivery delay of display device 200($n$) (where n=1, 2, 3)

$f_n$: the frequency of dropped frames of display device 200 ($n$) (where n=1, 2, 3)

$v_n$: the frequency of video dropouts of display device 200 ($n$) (where n=1, 2, 3)

Note that the coefficients are assumed to be determined arbitrarily by the designer.

The "frequency of dropped frames" of each display device shown in FIG. 15 is a value obtained by totaling the frequencies of dropped frames from the video delivery apparatus 600 up to each of the display devices (the frequencies of dropped frames in FIG. 14B), and the values shown in FIG. 14B are calculated by the delivery tree reconstruction unit of the present embodiment. Furthermore, the "frequency of video dropouts" of each display device shown in FIG. 15 is a value obtained by totaling the "malfunction/withdrawal frequencies" from the video delivery apparatus 600 up to each of the display devices, and the values shown in FIG. 15 are calculated by the delivery tree reconstruction unit of the present embodiment. The results of calculating this evaluation function using these values are indicated by the evaluation function output values" shown in FIG. 15.

Out of the patterns in FIGS. 13G, K, M, N, and O, in which the video delivery delay is the lowest, the pattern whose evaluation function output value is the lowest is the pattern in FIG. 13O. For this reason, the post-control right movement delivery tree selected by the delivery tree reconstruction unit of the eighth embodiment is as shown in FIG. 12B.

In this manner, in the eighth embodiment, evaluation values are calculated for each delivery tree using the transfer delay arising at each node and the degree of instability of video delivery in each node as parameters, and the post-modification delivery tree is determined based on the video delivery delay and the evaluation values. Here, the "degree of instability" includes at least one of, for example, the frequency of dropped frames based on a two-node combination in which the nodes are connected as parent and child, and the withdrawal/malfunction frequency of relay nodes for each of the nodes.

Note that in the eighth embodiment, a maximum permissible value may be set for the evaluation function output value, and the ALM delivery tree reconstruction may be omitted in the case where a reconstruction pattern having an evaluation function output value less than or equal to that maximum permissible value does not exist.

For example, assume a maximum permissible value of 2000 is set for the evaluation function output value. In this case, when the control right has moved as described above, the evaluation function value of the reconstruction pattern (O), which has the lowest evaluation function value, is 2157, and thus the delivery tree reconstruction itself is not carried out.

In such a manner, prohibiting the modification of the delivery tree in cases where a delivery tree pattern having an evaluation value within a predetermined permitted range does not exist prevents the delivery tree from being updated inappropriately.

The first through eighth embodiments describe reconstructing the ALM delivery tree in accordance with the movement of the control right. In cases where such ALM delivery tree reconstruction is to be carried out in a video delivery system, techniques for providing notifications regarding the timing of the reconstruction, exclusive control during the reconstruction, and notifying the nodes of the post-reconstruction tree structure data, are necessary. Furthermore, because video dropouts occur during the reconstruction, a technique for clearly warning users of the impending dropout, or a technique for playing back the video so that the video dropout is not apparent, is also necessary. Such configurations shall be described in the following ninth through fourteenth embodiments.

Figure 16:
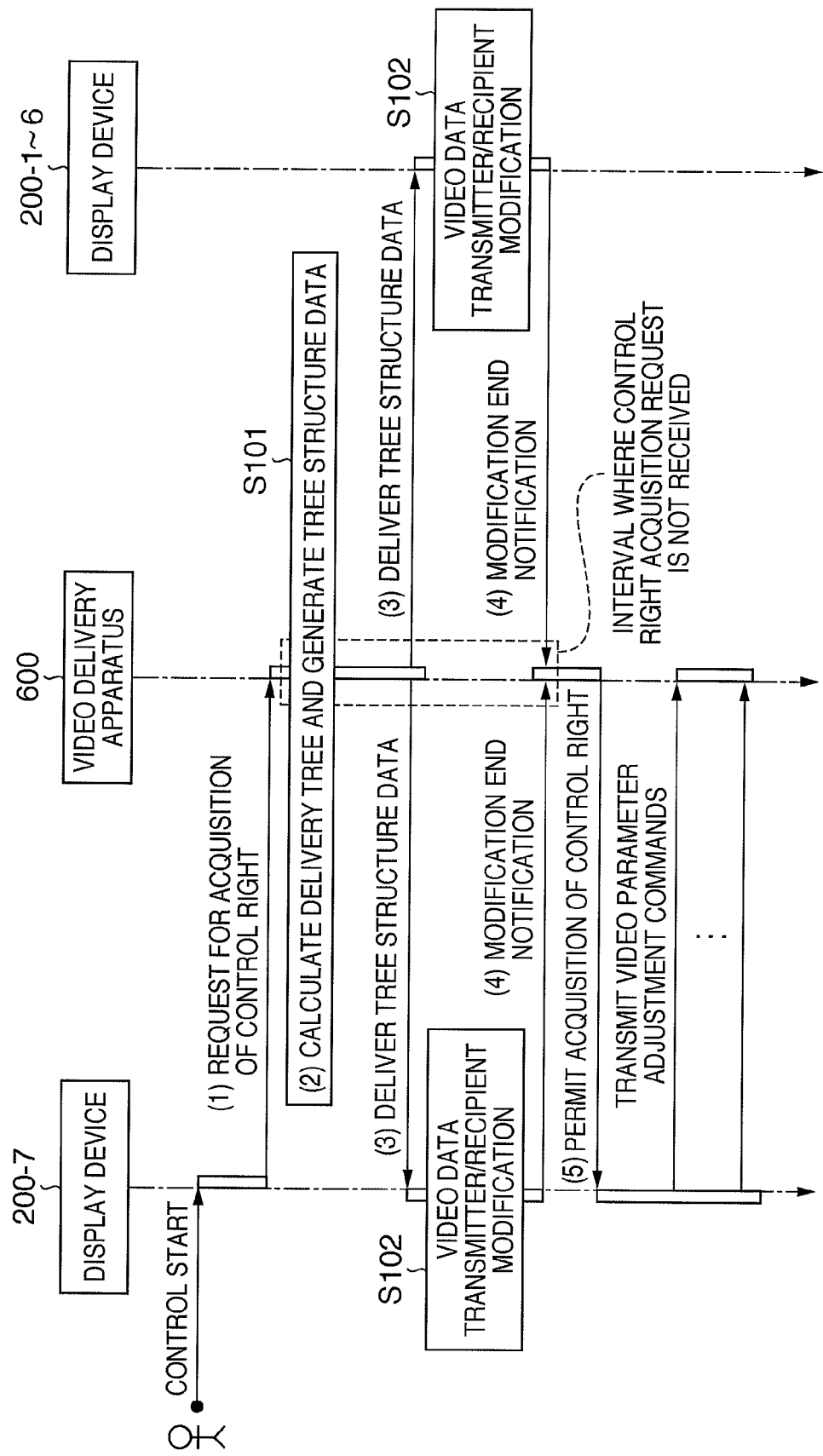
FIG. 16 is a diagram illustrating an example of a sequence for the reconstruction of an ALM delivery tree in accordance with the movement of a control right according to an embodiment.

The ninth embodiment describes exclusive control during the ALM delivery tree reconstruction using FIG. 16. FIG. 16 is a reconstruction sequence for the delivery tree used in the example of the first embodiment (FIGS. 6A and 6B).

When a user commences control of the imaging apparatus using the display device 200-7, the display device 200-7 makes a request for acquiring the control right to the video delivery apparatus 600. Having received the request, the video delivery apparatus 600 calculates the delivery tree and executes a process for generating the tree structure data (S101), and delivers the result of the ALM delivery tree reconstruction to the display devices 200 as delivery tree data such as that shown in FIG. 17.

The display device 200 that received the delivery tree data executes a video data transmitter/recipient modification process (S102), and notifies the video delivery apparatus 600 when the modification has ended using, for example, unicast. Having received notifications that the modification has ended from all the display devices, the video delivery apparatus 600 notifies the display device 200-7 that it is permitted to acquire the control right. In this manner, the display device 200-7 can secure the control right and transmit video parameter adjustment commands.

As described thus far, according to the ninth embodiment, it is possible to ensure exclusive control so that the delivery tree reconstruction does not commence until the video data transmitter/recipient modification has ended for all nodes.

Here, during the interval between when the video delivery apparatus 600 has received the control right acquisition request and when the modification end notification has been received from all the display devices, the video delivery apparatus 600 prohibits the reception of a new control right acquisition request. Such control makes it possible to prevent the commencement of a new delivery tree reconstruction on top of the delivery tree reconstruction currently being performed.

In addition, in the case where all modification end notifications cannot be confirmed even after a certain set amount of time has passed, the video delivery apparatus 600 performs a process for notifying the display device 200-7 of permission to acquire the control right (a timeout process). In other words, the control right, through which the display device 200-7 performs parameter adjustment and the like, is vested. At this time, the reception of control right acquisition requests from other display devices is also resumed.

Figure 18:
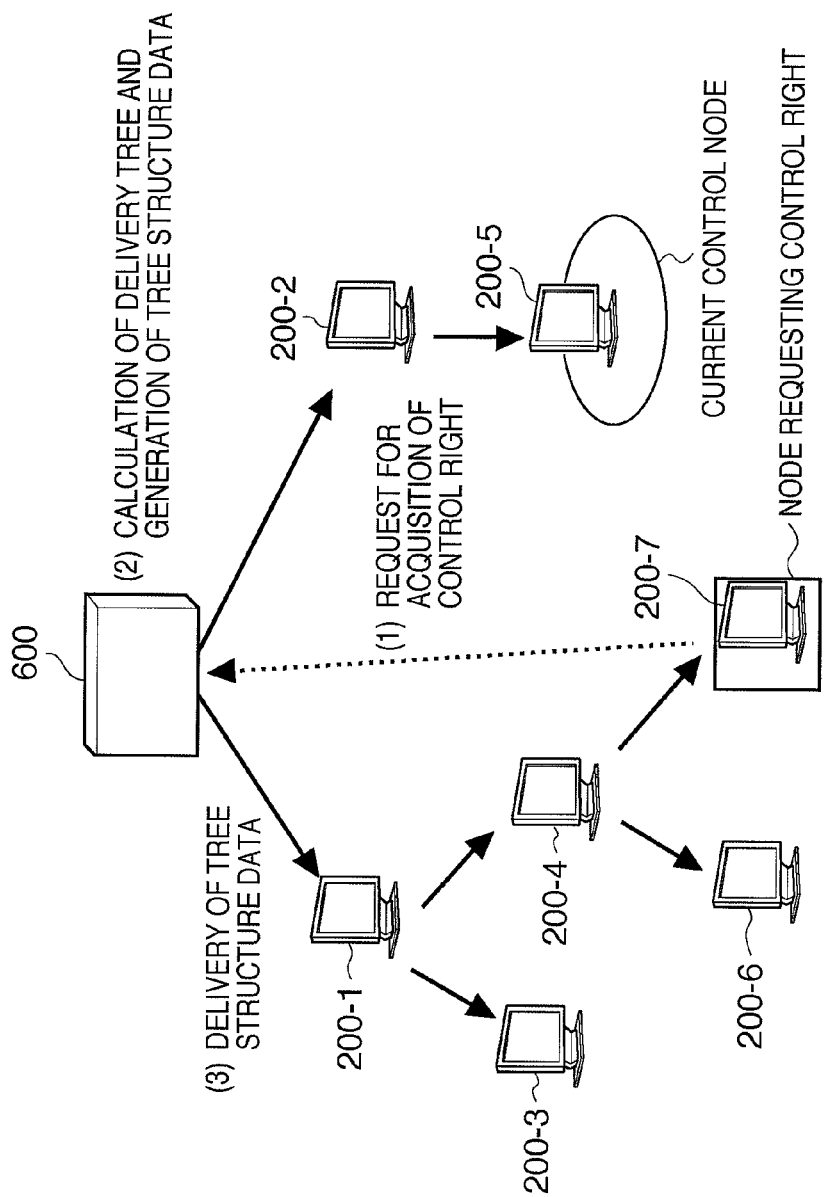
FIG. 18 is a diagram illustrating an example of a collaboration (when delivering tree structure data) when reconstructing a delivery tree according to an embodiment.

A tenth embodiment describes a technique whereby each node is notified of the post-reconstruction tree structure data. In other words, the tenth embodiment describes processing for transmitting delivery tree data at the time of ALM delivery tree reconstruction and modification end notifications as performed in a video delivery system using one of the video delivery apparatuses in the first through third embodiments. This ALM delivery tree reconstruction process may use one of the same processes described in the fourth through the eighth embodiments. In the tenth embodiment, newly-calculated delivery tree data 409 is delivered in accordance with the pre-reconstruction delivery tree. However, notifications of the end of the video data transmitter/recipient modification processes (modification end notifications) are collected in accordance with the post-reconstruction ALM delivery tree. FIGS. 18 and 19 are diagrams illustrating collaboration during the delivery tree reconstruction, according to the tenth embodiment.

As shown in FIG. 18, upon receiving a control right acquisition request, the video delivery apparatus 600 calculates a new ALM delivery tree and generates delivery tree data 409. The video delivery apparatus 600 delivers the delivery tree data 409 to the display devices 200-1 and 200-2 in accordance with the pre-reconstruction delivery tree (the pre-modification delivery tree). Furthermore, the display device 200-1 delivers data to the display devices 200-3 and 200-4 in accordance with the pre-reconstruction delivery tree. Thereafter, in the same manner, new delivery tree data (tree structure data) is delivered to all the display devices through delivery performed in accordance with the pre-reconstruction ALM delivery tree.

Next, as shown in FIG. 19, the display device 200-4 that has received the new delivery tree data modifies the video data transmitters/recipients in accordance with the new delivery tree data. When this modification ends, the display device 200-4 transmits a modification end notification to the display device 200-7 in accordance with the post-reconstruction ALM delivery tree. In addition, when the video data transmitter/recipient modification based on the new ALM delivery tree ends, the display device 200-6 also transmits a modification end notification to the display device 200-7 in accordance with the post-reconstruction delivery tree (the post-modification delivery tree).

Furthermore, if its own video data transmitter/recipient modification has ended, the display device 200-7 collects the modification end notifications of the display devices 200-4 and 200-6 and its own modification end notification, and transmits these notifications to the display device 200-1, which is the parent node.

Note that the display device 200-7 may perform a timeout process with respect to the reception of the stated modification notification. In other words, in the case where no modification end notification is received from the display device 200-4 or 200-6 within a certain set amount of time, the display device 200-7 collects any received modification end notifications and its own modification end notification, and transmits these to the display device 200-1, which is the parent node. Thereafter, by repeating the collection and transmission in the same manner in accordance with the post-reconstruction delivery tree, the video delivery apparatus 600 collects the modification end notifications from all the display devices.

An eleventh embodiment describes a configuration that clearly notifies a user of a video dropout (where the video becomes discontinuous) occurring at the time of ALM delivery tree reconstruction, thereby warning the user. The eleventh embodiment shall also be described using a video delivery system illustrated in the first through third embodiments. When the ALM delivery tree is reconstructed, the post-reconstruction delivery timing of some nodes is slower than before the reconstruction, and faster for other nodes. Assuming that the communication speed between nodes is constant, delay occurs in nodes that move down the ALM delivery tree, whereas lead occurs in nodes that move up the ALM delivery tree.

In order to eliminate such skew in the delivery timing, in the eleventh embodiment, video frames are skipped in display devices that have moved up, whereas the video is paused in display devices that have moved down. At this time, a message indicating that video frames have been skipped is displayed in the display devices that have moved up, whereas a message indicating that the video is paused is displayed in the display devices that have moved down. By displaying such a message to users, the occurrence of video dropouts (areas where the video is discontinuous) caused by skew in the delivery timing can be communicated clearly. Note, however, that the notification of video dropouts is not limited to the stated message display; the notification may be made by generating a sound.

As described thus far, in the eleventh embodiment, when post-update delivery tree data is received, the change in delay between the video data received in accordance with the pre-update delivery tree and the video data received in accordance with the post-update delivery tree is determined. Then, display control is performed so as to make a display based on the skipping or delay of video frames caused by determined changes in the delay in a display device for displaying the video data. Thus, according to the eleventh embodiment, it is possible to clearly notify a user of a video dropout occurring at the time of delivery tree reconstruction, thereby warning the user.

A twelfth embodiment describes a configuration in which playback is carried out in a display device that has moved down in a manner whereby video dropouts are hidden from the user. In the twelfth embodiment, when a display device has moved down the ALM delivery tree in a video delivery system as illustrated in the first through third embodiments, the video is played back in slow motion prior to that movement, thereby hiding video dropouts caused by skew in the delivery timing from the user.

Figure 20A:
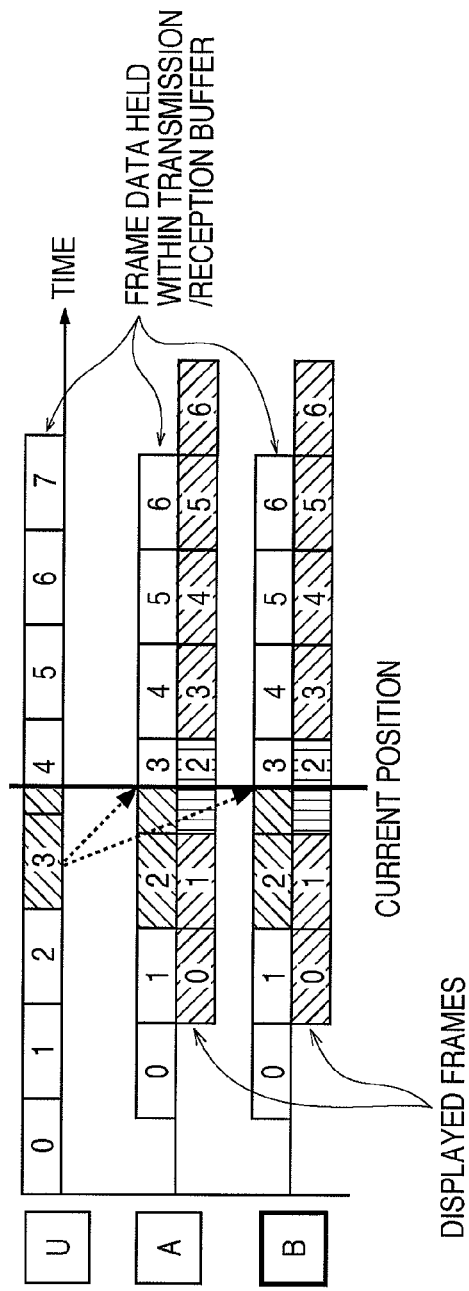
FIGS. 20A and 20B are diagrams illustrating an example of the delivery state of data in the case where a node moves downward as a result of reconstruction (a normal state) according to an embodiment.
Figure 20B:
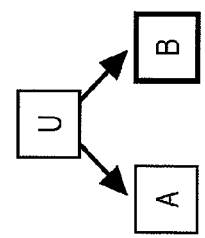

Hereinafter, an example of operations performed in the twelfth embodiment shall be described using FIGS. 20A to 23B. FIG. 20B expresses a normal state prior to ALM delivery tree reconstruction, in which node U, serving as a parent node, delivers video data to nodes A and B, each serving as child nodes. Note that node U may be a video delivery apparatus, or may be a display device serving as a delivery relay apparatus. In FIG. 20A, meanwhile, the blocks above the time axis express frame data within a video data transmission/reception buffer, the diagonally-hatched portions being frame data that is being held at the present point in time. Note that the blocks below the time axis express the displayed frames, the vertically-hatched portions being the frame that is being displayed at the present point in time.

Figure 21A:
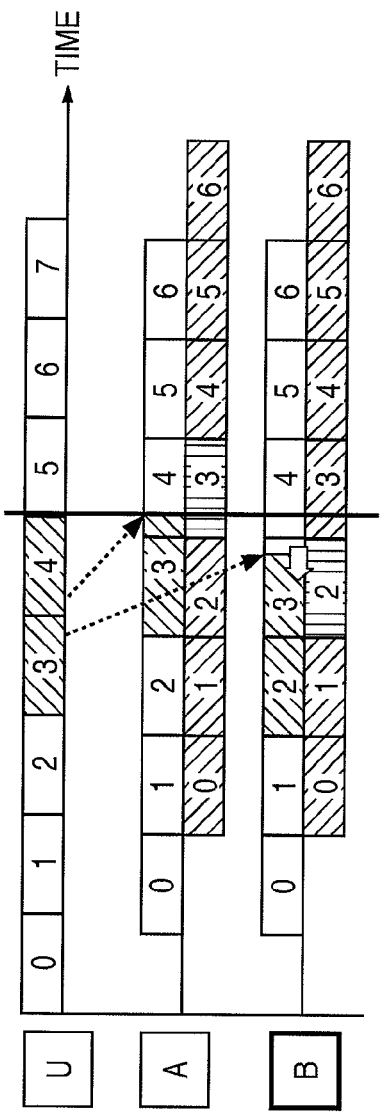
FIGS. 21A and 21B are diagrams illustrating an example of the delivery state of data in the case where a node moves downward as a result of reconstruction (slow-motion playback) according to an embodiment.
Figure 21B:
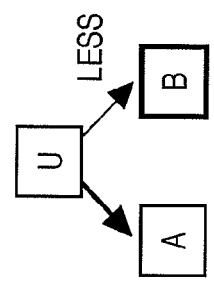
Figure 22A:
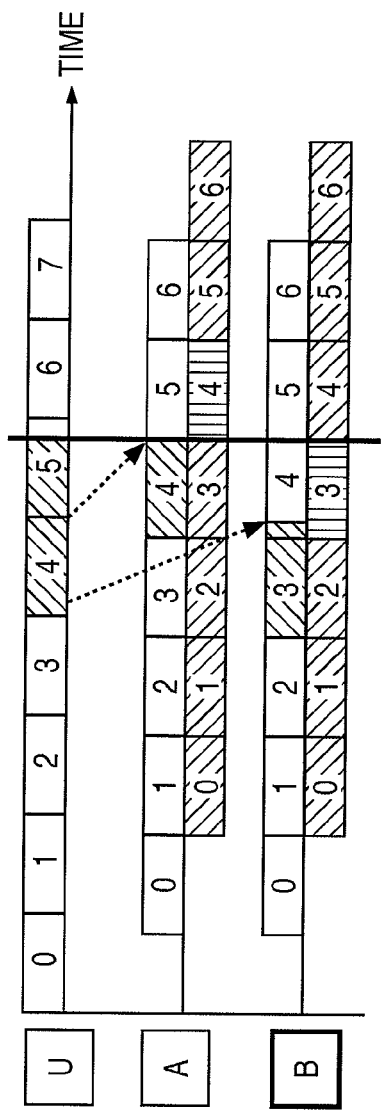
FIGS. 22A and 22B are diagrams illustrating an example of the delivery state of data in the case where a node moves downward as a result of reconstruction (immediately before reconstruction) according to an embodiment.
Figure 22B:
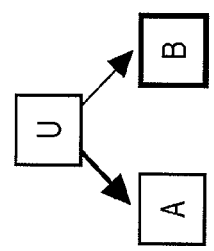

In the case where the node B has moved down, the display timing is gradually delayed by performing slow-motion playback, as shown in FIGS. 21A and 21B; as shown in FIGS. 22A and 22B, immediately before the reconstruction, the device is put into a state in which it is capable of playback even using the post-reconstruction delivery timing.

Figure 23A:
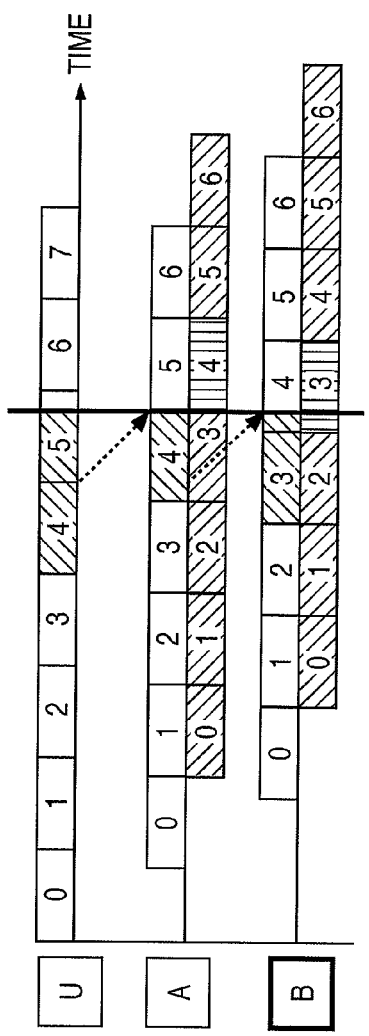
FIGS. 23A and 23B are diagrams illustrating an example of the delivery state of data in the case where a node moves downward as a result of reconstruction (immediately after reconstruction) according to an embodiment.
Figure 23B:
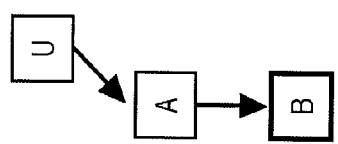

When the reconstruction then occurs, as shown in FIGS. 23A and 23B, node B receives the delivery of the video data from node A, and thus the delivery timing is delayed; however, video dropouts do not occur at node B because the display timing has been sufficiently delayed beforehand.

As described thus far, in the twelfth embodiment, when a display device functioning as a parent node has received post-update delivery tree data, the change in the video data delay time at the display device connected therebelow is determined. Based on this change, the display device controls the delivery of the video data to the child node so that video frame drops and/or stoppage does not occur during the delivery tree update.

In the particular case where a child node is to become a grandchild node due to the delivery tree update, in the twelfth embodiment, the video data is delivered so that the child node that will move executes slow-motion playback, in order to make the delivery delay match when the node has become a grandchild node. Through this, according to the twelfth embodiment, it is possible to perform playback so that video dropouts are hidden from the user.

A thirteenth embodiment describes a configuration in which playback is carried out in a display device that has moved up in a manner whereby video dropouts are hidden from the user. In the thirteenth embodiment, when a display device has moved up the delivery tree in a video delivery system as illustrated in the first through third embodiments, the video is played back at a faster speed, thereby hiding video dropouts caused by skew in the delivery timing from the user.

Hereinafter, an example of operations performed in the thirteenth embodiment shall be described using FIGS. 24A to 27B. FIGS. 24A and 24B illustrate a state immediately prior to ALM delivery tree reconstruction, where node U delivers video data to node A, and node A delivers video data to node C. Note that node U may be a video delivery apparatus, or may be a display device serving as a delivery relay apparatus.

Figure 25A:
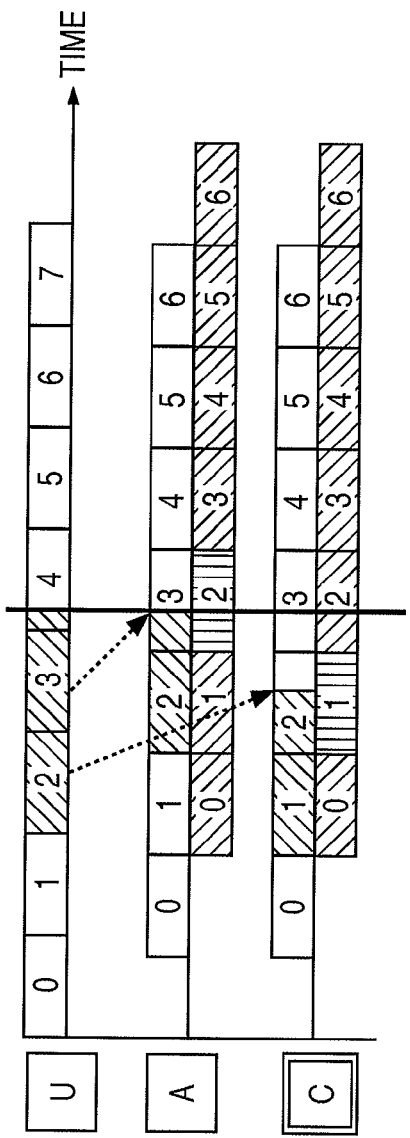
FIGS. 25A and 25B are diagrams illustrating an example of the delivery state of data in the case where a node moves upward as a result of reconstruction (immediately after reconstruction) according to an embodiment.
Figure 25B:
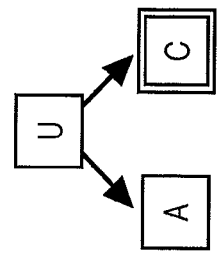

In the case where node C moves up, reconstruction is first performed as shown in FIGS. 25A and 25B. This causes node C to receive the delivery of video data from node U. At this time, it is necessary for the video data of the frames that node C is to play back next to be prepared in a video data transmission/reception buffer of node U. Here, it is assumed that the video data that has already been played back by each display device is held in the transmission/reception buffers of the respective nodes, and that this video data is used at the time of reconstruction.

Figure 26A:
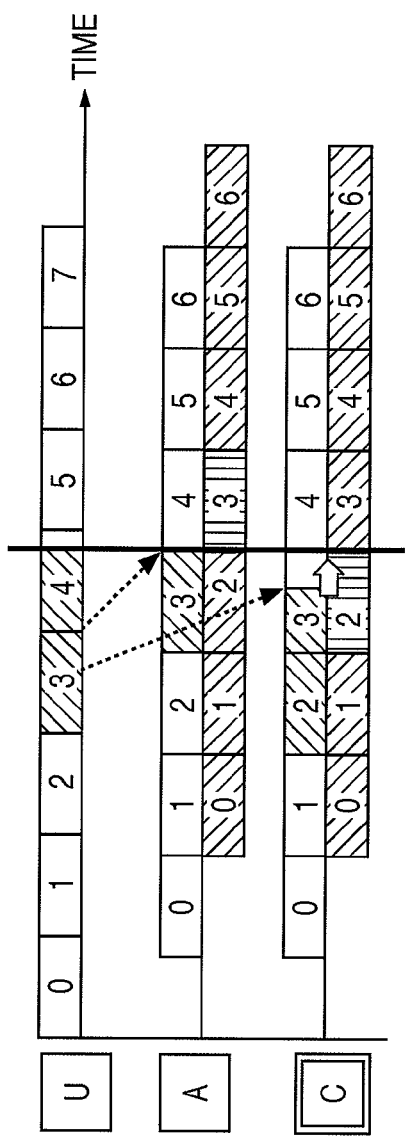
FIGS. 26A and 26B are diagrams illustrating an example of the delivery state of data in the case where a node moves upward as a result of reconstruction (higher-speed playback) according to an embodiment.
Figure 26B:
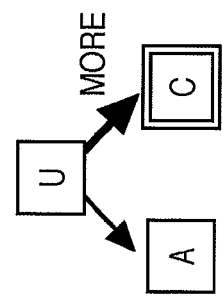
Figure 27A:
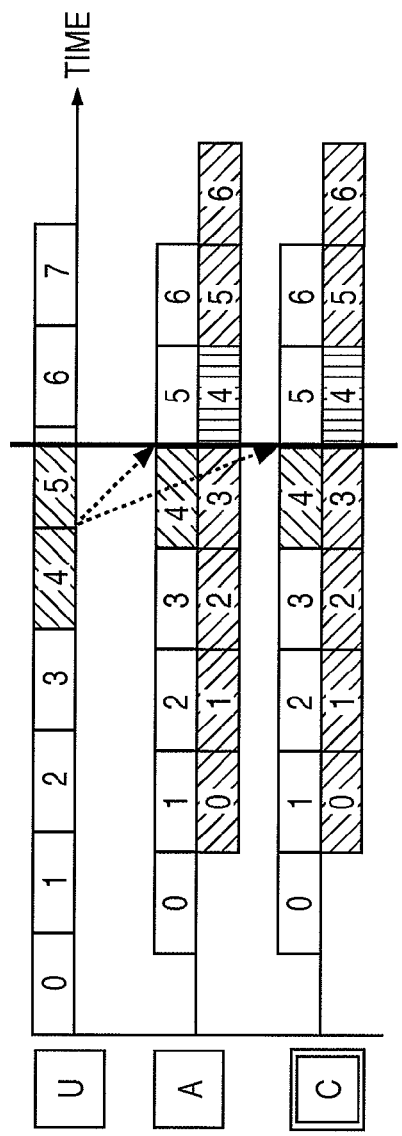
FIGS. 27A and 27B are diagrams illustrating an example of the delivery state of data in the case where a node moves upward as a result of reconstruction (a normal state) according to an embodiment.
Figure 27B:
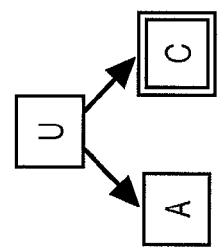

As shown in FIGS. 26A and 26B, node C gradually speeds up the display timing by performing playback at a higher speed. Then, when, as shown in FIGS. 27A and 27B, the timing of delivery to node C catches up with the child node timing (that is, the same timing as node A), the higher-speed playback in node C is cancelled, and the playback returns to the normal state. Performing such higher-speed playback makes it possible to hide video dropouts occurring in node C from the user.

As described thus far, according to the thirteenth embodiment, in the case where a grandchild node has become a child node due to a delivery tree update, the display device first commences delivery starting with video frames delayed so that the video frames are continuous in the post-movement child node. Then, the video data is delivered so that the post-movement child node is caused to perform playback at a higher speed, so as to have the delivery delay of the child node. Through this, according to the thirteenth embodiment, it is possible to perform playback so that video dropouts are hidden from the user.

In the thirteenth embodiment, the speed of transmission from the parent node U to node C is increased while node C is performing the higher-speed playback, as shown in FIG. 26B. Accordingly, a method for lightening the burden of transmission placed on the parent node of the node that moves up is required.

In a fourteenth embodiment, a video delivery system illustrated in the first through third embodiments is used. As described in the twelfth and thirteenth embodiments, in the case where nodes of different layers have been interchanged, higher-speed playback is performed by the node that has moved up in the ALM delivery tree, whereas slow-motion playback is performed by the node that has moved down in the ALM delivery tree. In the fourteenth embodiment, the transmission burden on the parent node of the node that moves up is lightened by the node that moves up receiving, from the parent node of the node that moves down, the video data necessary to perform higher-speed playback.

Operations performed in the fourteenth embodiment shall be described using FIGS. 28A to 32B. FIGS. 28A and 28B illustrate a normal state before ALM delivery tree reconstruction, where node U delivers video data to nodes A and B, and node A delivers video data to node C.

Figure 29A:
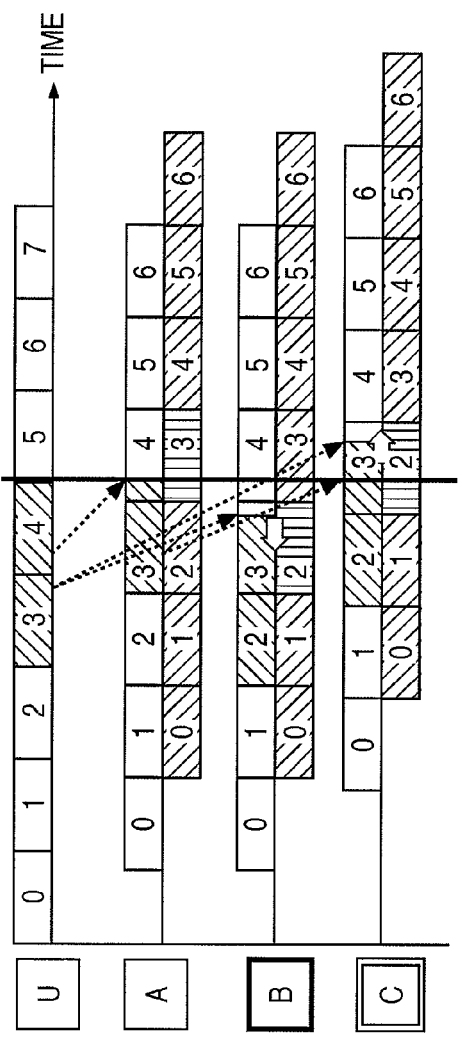
FIGS. 29A and 29B are diagrams illustrating an example of the delivery state of data in the case where two nodes have switched places as a result of reconstruction (slow-motion playback and higher-speed playback) according to an embodiment.
Figure 29B:
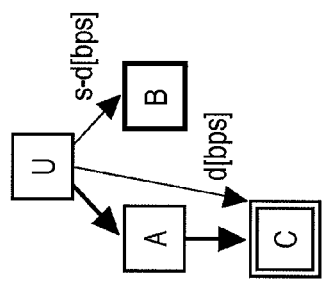

Starting from this state, in the case where node B moves down and, at the same time, node C moves up, node B gradually delays its display timing by performing slow-motion playback, while at the same time, node C gradually speeds up its display timing by performing higher-speed playback, as shown in FIGS. 29A and 29B. At this time, the additional video data required by node C to perform the higher-speed playback is received from the parent node of node B, or node U. Note that unicast, for example, is used for the communication of video data between nodes U and C.

As shown in FIG. 28B, the transmission speed from node U to node B in the normal state is taken as s[bps]. In FIG. 29B, node B is performing slow-motion playback, and thus the transmission speed is reduced by d[bps], resulting in a speed of s-d[bps], and the amount d[bps] is shifted to the transmission of video data to node C. By performing such control, it is possible to suppress the total transmission speed of node U to the same s[bps] as the normal state.

Figure 30A:
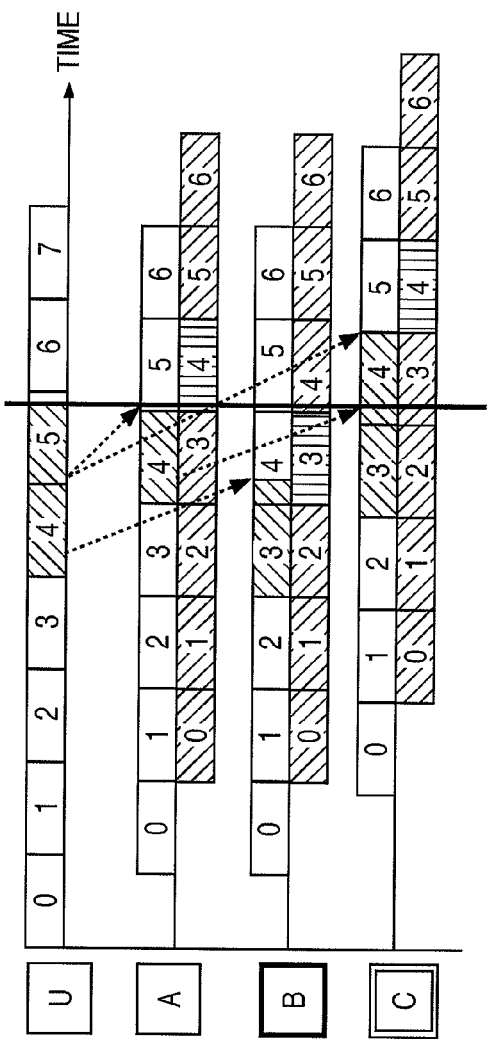
FIGS. 30A and 30B are diagrams illustrating an example of the delivery state of data in the case where two nodes have switched places as a result of reconstruction (immediately before reconstruction) according to an embodiment.
Figure 30B:
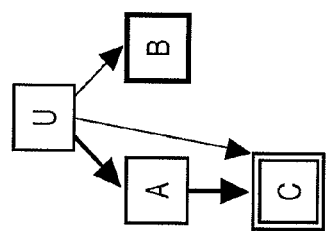

In this manner, as shown in FIGS. 30A and 30B, the delivery timing of node B, which is to change from a child node to a grandchild node, matches the delivery timing of the grandchild node immediately prior to ALM delivery tree reconstruction. Similarly, the delivery timing of node C, which is to change from a grandchild node to a child node, matches the delivery timing of the child node. When the ALM delivery tree reconstruction is performed at this timing, each node receives/delivers the video at the timing shown in FIGS. 31A and 31B.

Figure 32A:
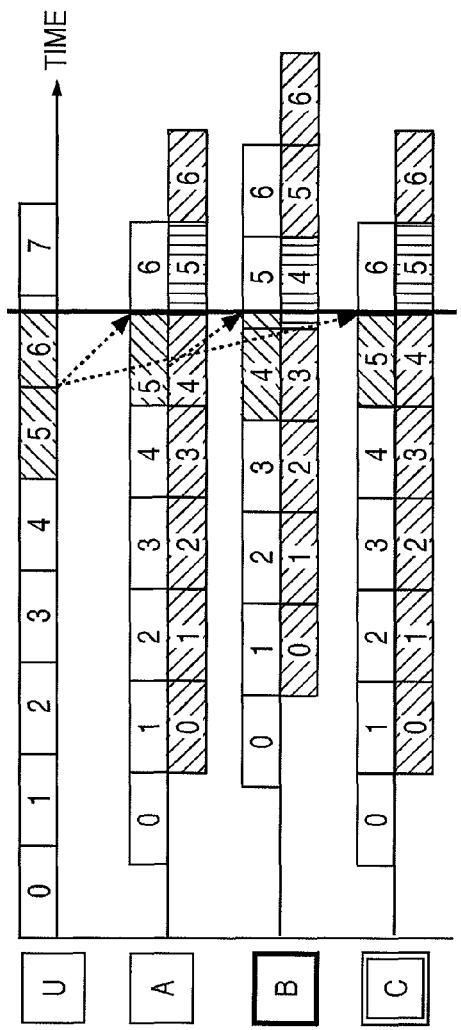
FIGS. 32A and 32B are diagrams illustrating an example of the delivery state of data in the case where two nodes have switched places as a result of reconstruction (a normal state) according to an embodiment.
Figure 32B:
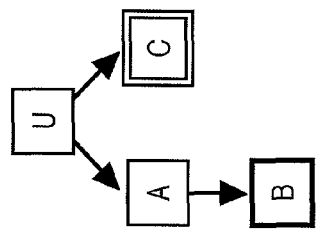

In the present example, the delivery timings of each of the post-movement nodes matches the delivery delay of the respective movement destinations, and thus the state returns to the normal state as-is, as shown in FIGS. 32A and 32B. However, in the case where, for example, the ALM delivery tree reconstruction has been performed in a state in which further fast-forwarding is required in node C, the higher-speed playback as illustrated in FIGS. 26A and 26B is performed.

As described thus far, according to the fourteenth embodiment, in the case where a child node and a grandchild node are interchanged due to a delivery tree update, the display device causes the pre-movement child node to perform slow-motion playback so as to match the delivery delay when becoming the grandchild node. In addition, the video data is delivered to the pre-movement grandchild node using, for example, unicast, so as to cause the grandchild node to execute higher-speed playback in order to match the delivery delay when becoming a child node. For this reason, in the case where a child node and a grandchild node are interchanged, it is possible to perform playback in both nodes so that video dropouts are hidden from the user.

Furthermore, according to the fourteenth embodiment, the video data is delivered to the grandchild node through, for example, unicast, using surplus bandwidth resulting from having reduced the amount of video data delivered to the child node for slow-motion playback. Accordingly, when performing playback so that video dropouts are hidden from the user, the burden of transmission placed on the parent node can be reduced.

The present invention can also be applied to the delivery of video that has been stored, and is not limited to the delivery of video that has been captured. In addition, the present invention can generally be applied to any delivery scheme that uses a delivery structure in which the delivery order is standardized, such as delivery trees, and is not limited to application-layer multicast (ALM).

As described thus far, according to the abovementioned embodiments, a delivery tree is automatically modified so that the video response to an operation performed on a video delivery apparatus through a display device having a control right is sped up, thereby improving the operability of the display device that has the control right.

Furthermore, because the number of display devices that relay the video data between the video delivery apparatus and the display device that has the control right is reduced, the influence of relay display device malfunctions, withdrawals from the delivery group, and so on is also reduced, stabilizing the video in the display device that has the control right.

Finally, in the case where the tree structure data of the delivery tree is delivered to each display device (delivery relay apparatus), the case where the video delivery apparatus is notified of the end of video data transmitter/recipient modification, and so on, the data is transmitted/received in accordance with the delivery tree, and thus the burden of communication on the video delivery apparatus can be lightened.

Note that the case where the functionality of the abovementioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120761, filed May 2, 2008, which is hereby incorporated by reference herein in its entirety.

What is claimed is:

1. A video delivery apparatus comprising:
a delivery unit configured to deliver video data captured by a capturing unit to multiple display devices via a network in accordance with a delivery tree;
an assigning unit configured to assign a control right for controlling capturing direction, zoom ratio, white balance, brightness, saturation, aperture, ISO sensitivity or color depth of the capturing unit to one of the multiple display devices included in the delivery tree; and
a changing unit configured to change, according to a delivery delay of the video data to a display device to which the control right is assigned by the assigning unit, a position of the display device to which the control right is assigned within the delivery tree so that the delivery delay of the video data to the display device to which the control right is assigned by the assigning unit is reduced.

2. The apparatus according to claim 1, wherein the changing unit is configured to change the position of the display device to which the control right is assigned within the delivery tree so that a device that relays the video data is present between the display device to which the control right is assigned by the assigning unit and the delivery unit in a case where delivery cannot be made directly from the delivery unit to the display device to which the control right is assigned by the assigning unit.

3. The apparatus according to claim 1, wherein in a case where the control right has been assigned in a predetermined display device, the changing unit changes the position of the display device to which the control right is assigned within the delivery tree so that the video data is not delivered by the display device to which the control right is assigned by the assigning unit to another device.

4. The apparatus according to claim 1, wherein the changing unit is configured to change the position of the display device to which the control right is assigned within the delivery tree in accordance with a frequency at which relay of the video data is not performed by the multiple display devices.

5. The apparatus according to claim 1, wherein the changing unit includes a notification unit configured to notify the multiple display devices of delivery tree data indicating the post-changing delivery tree, and the assigning unit includes a reception unit configured to receive, from the multiple display devices, completion signals indicating that a processing of the delivery tree data notified by the notification unit has been completed, and when the reception unit has received the completion signals from the multiple display devices, the assigning unit assigns the control right for adjusting parameters of the video data in one of the multiple display devices.

6. The apparatus according to claim 1, wherein the changing unit is configured to change the position of the display device to which the control right is assigned within the delivery tree so that the display device to which the control right is assigned by the assigning unit delivers the video data to another display device.

7. The apparatus according to claim 1, further comprising the capturing unit configured to capture video data.

8. The apparatus according to claim 1, wherein the changing unit is configured to change the position of the display device to which the control right is assigned within the delivery tree so that the delivery delay of the video data to the display device to which the control right is assigned by the assigning unit is smaller than a delivery delay of the video data to at least one other of the multiple display devices to which the control right is not assigned.

9. The apparatus according to claim 1, wherein in a case where the display device to which the control right is assigned has a data transmission capability lower than a predetermined standard, the changing unit changes the position of the display device to which the control right is assigned within the delivery tree so that the video data is not delivered by the display device to which the control right is assigned by the assigning unit to another device.

10. A video delivery method executed by a video delivery apparatus, the method comprising the steps of:
delivering video data captured by a capturing unit to multiple display devices via a network in accordance with a delivery tree;
assigning a control right for controlling capturing direction, zoom ratio, white balance, brightness, saturation, aperture, ISO sensitivity or color depth of the capturing unit to one of the multiple display devices included in the delivery tree; and
changing, according to a delivery delay of the video data to a display device to which the control right is assigned by the assigning step, a position of the display device to which the control right is assigned within the delivery tree so that the delivery delay of the video data to the display device to which the control right is assigned is reduced.

11. The method according to claim 10, wherein the changing step changes the position of the display device to which the control right is assigned within the delivery tree so that a device that relays the video data is present between the display device to which the control right is assigned and the video delivery apparatus in a case where delivery cannot be made directly from the video delivery apparatus to the display device to which the control right is assigned.

12. The method according to claim 10, wherein in a case where the control right has been assigned to a predetermined display device, the changing step of changes the position of the display device to which the control right is assigned within the delivery tree so that the video data is not delivered by the display device to which the control right is assigned to another device.

13. The method according to claim 10, wherein the changing step changes the position of the display device to which the control right is assigned within the delivery tree in accordance with a frequency at which relay of the video data is not performed by the multiple display devices.

14. The method according to claim 10, wherein the changing step includes notifying the multiple display devices of delivery tree data indicating the post-changing delivery tree, and the assigning step includes receiving, from the multiple display devices, completion signals indicating that a processing of the delivery tree data notified in the notifying step has been completed, and when the completion signals have been received from the multiple display devices in the receiving step, the assigning step assigns the control right for adjusting parameters of the video data to one of the multiple display devices.

15. The method according to claim 10, wherein the changing step includes a step of skipping a video frame or pausing the video data in accordance with the changing of the position of the display device to which the control right is assigned within the delivery tree in order to eliminate a skew between a delivery timing of the video data from the video delivery apparatus to one of the multiple display devices before the changing and a delivery timing of the video data from the video delivery apparatus to the one of the multiple display devices after the changing.

16. The method according to claim 10, wherein the changing step includes a step of slow-motion playback or higher-speed playback in accordance with the changing of the position of the display device to which the control right is assigned within the delivery tree in order to avoid video frame drops or stoppage in delivery of the video data.

17. The method according to claim 10, wherein the changing step changes the position of the display device to which the control right is assigned within the delivery tree so that the display device to which the control right is assigned delivers the video data to another device.

18. The method according to claim 10, further comprising a step of capturing video data by the capturing unit.

19. The method according to claim 10, wherein the changing step changes the position of the display device to which the control right is assigned within the delivery tree so that the delivery delay of the video data to the display device to which the control right is assigned is smaller than a delivery delay of the video data to at least one other of the multiple display devices to which the control right is not assigned.

20. The method according to claim 10, in a case where the display device to which the control right is assigned has a data transmission capability lower than a predetermined standard, the changing step changes the position of the display device to which the control right is assigned within the delivery tree so that the video data is not delivered by the display device to which the control right is assigned to another device.

21. A non-transitory computer-readable storage medium in which is stored a computer program for causing a video delivery apparatus to execute the steps of:
   delivering video data captured by a capturing unit to multiple display devices via a network in accordance with a delivery tree;
   assigning a control right for controlling capturing direction, zoom ratio, white balance, brightness, saturation, aperture, ISO sensitivity or color depth of the capturing unit to one of the multiple display devices included in the delivery tree; and
   changing, according to a delivery delay of the video data to a display device to which the control right is assigned, a position of the display device to which the control right is assigned within the delivery tree so that the delivery delay of the video data to the display device to which the control right is assigned is reduced.

22. The medium according to claim 21, wherein the changing step changes the position of the display device to which the control right is assigned within the delivery tree so that a device that relays the video data is present between the display device to which the control right is assigned and the video delivery apparatus in a case where delivery cannot be made directly to the display device to which the control right is assigned.

23. The medium according to claim 21, wherein in a case where the control right has been assigned to a predetermined display device, the changing step changes the position of the display device to which the control right is assigned within the delivery tree so that the video data is not delivered by the display device to which the control right is assigned to another device.

24. The medium according to claim 21, wherein the changing step changes the position of the display device to which the control right is assigned within the delivery tree in accordance with a frequency at which relay of the video data is not performed by the multiple display devices.

25. The medium according to claim 21, wherein the changing step includes notifying the multiple display devices of delivery tree data indicating the post-changing delivery tree, and
   the assigning step includes receiving, from the multiple display devices, completion signals indicating that a processing of the notified delivery tree data has been completed, and when the completion signals have been received from the multiple display devices in the receiving step, the control right for adjusting parameters of the video data is assigned to one of the multiple display devices.

26. The medium according to claim 21, wherein the changing step changes the position of the display device to which the control right is assigned within the delivery tree so that the display device to which the control right is assigned delivers the video data to another display device.

27. The medium according to claim 21, the program further comprising a step of capturing video data by capturing unit.

28. The medium according to claim 21, wherein the changing step changes the position of the display device to which the control right is assigned within the delivery tree so that the delivery delay of the video data to the display device to which the control right is assigned is smaller than a delivery delay of the video data to at least one other of the multiple display devices to which the control right is not assigned.

29. The medium according to claim 21, wherein in a case where the display device to which the control right is assigned has a data transmission capability lower than a predetermined standard, the changing step changes the position of the display device to which the control right is assigned within the delivery tree, so that the video data is not delivered by the display device to which the control right is assigned to another device.

* * * * *